United States Patent
Hiraishi et al.

(10) Patent No.: US 7,016,071 B1
(45) Date of Patent: Mar. 21, 2006

(54) IMAGE RECOGNITON DEVICE, PERIPHERAL DEVICE CONNECTED WITH IMAGE RECOGNITION DEVICE, AND IMAGE PROCESSING SYSTEM

(75) Inventors: Junji Hiraishi, Kyoto (JP); Koichi Ohmae, Kyoto (JP); Takashi Kakiuchi, Kyoto (JP); Keitaro Taniguchi, Kyoto (JP)

(73) Assignee: Omron Corporation, (JP)

( * ) Notice: Subject to any disclaimer, the term of this patent is extended or adjusted under 35 U.S.C. 154(b) by 0 days.

(21) Appl. No.: 09/958,883

(22) PCT Filed: Apr. 28, 2000

(86) PCT No.: PCT/JP00/02804

§ 371 (c)(1),
(2), (4) Date: Jan. 22, 2002

(87) PCT Pub. No.: WO00/67464

PCT Pub. Date: Nov. 9, 2000

(30) Foreign Application Priority Data

| Apr. 30, 1999 | (JP) | ................................. 11/123529 |
| Jun. 4, 1999 | (JP) | ................................. 11/158518 |

(51) Int. Cl.
  *G06F 15/00* (2006.01)
(52) U.S. Cl. .......................................... 358/1.6; 358/1.1
(58) Field of Classification Search ................. 358/1.1,
  358/1.6, 2.1, 1.13, 1.18, 538, 540, 539, 530,
  358/450, 462
See application file for complete search history.

(56) References Cited

U.S. PATENT DOCUMENTS

| 6,052,479 | A | 4/2000 | Hiraishi et al. |
| 6,229,914 | B1 | 5/2001 | Hiraishi et al. |
| 6,563,999 | B1 * | 5/2003 | Suzuoki ........................ 386/46 |
| 6,694,050 | B1 | 2/2004 | Hiraishi et al. |
| 2003/0161536 | A1 * | 8/2003 | Iwamura et al. ............ 382/218 |

FOREIGN PATENT DOCUMENTS

| JP | 5-183745 | 7/1993 |
| JP | 5-183746 | 7/1993 |
| JP | 6-178066 | 6/1994 |
| JP | 06-214952 | 8/1994 |
| JP | 09-018708 | 1/1997 |
| JP | 9-18708 | 1/1997 |
| JP | 10-105481 | 4/1998 |
| JP | 10-198838 | 7/1998 |
| JP | 10-320209 | 12/1998 |
| JP | 11-275339 | 10/1999 |

* cited by examiner

*Primary Examiner*—Arthur G. Evans
(74) *Attorney, Agent, or Firm*—Dickstein Shapiro Morin & Oshinsky LLP

(57) ABSTRACT

A printer (30) prints image data received from a personal computer (20). The printer stores a recognition program, which is installed for the printer driver of the personal computer. The personal computer executes the received recognition program to carry out recognition. Upon detecting a specific image, the personal computer instructs the printer to discontinue the printing operation. An image processing system is thus provided which prohibits the printer from producing printout if the personal computer connected with the printer detects a prohibited image.

12 Claims, 30 Drawing Sheets

FIG.12
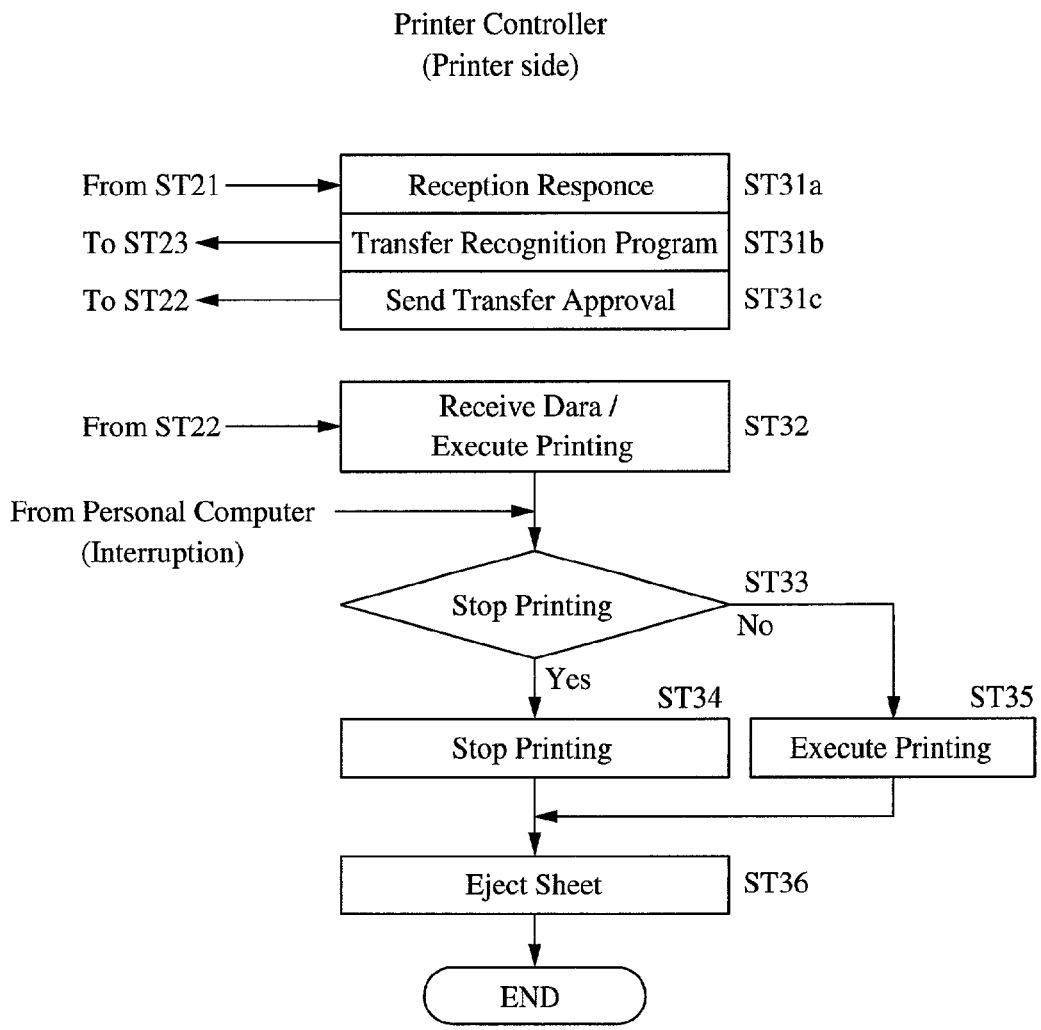
FIG.13
(a) 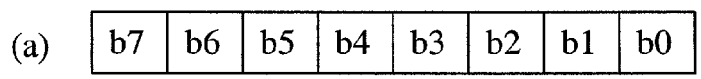
(b) 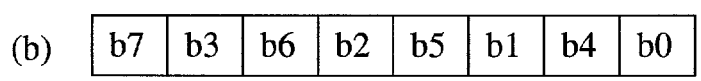
(c) 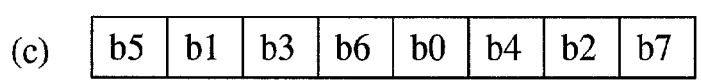

FIG.23
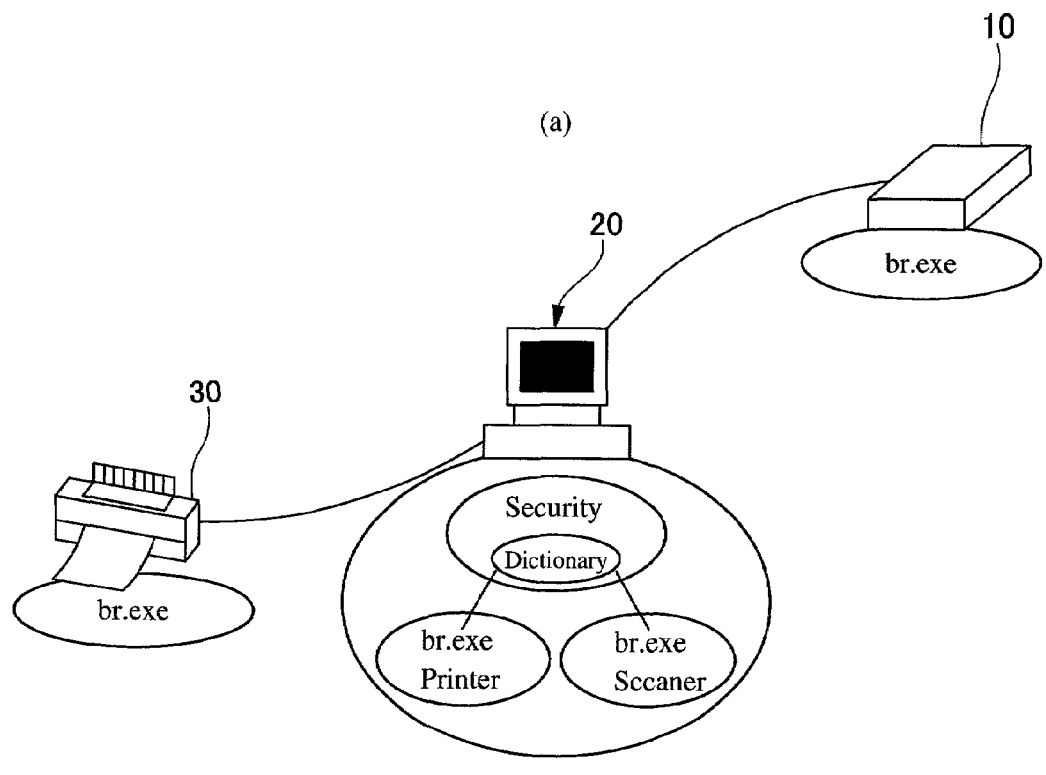
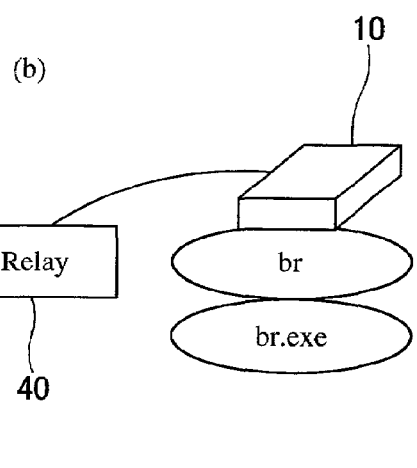

FIG.31
(a)
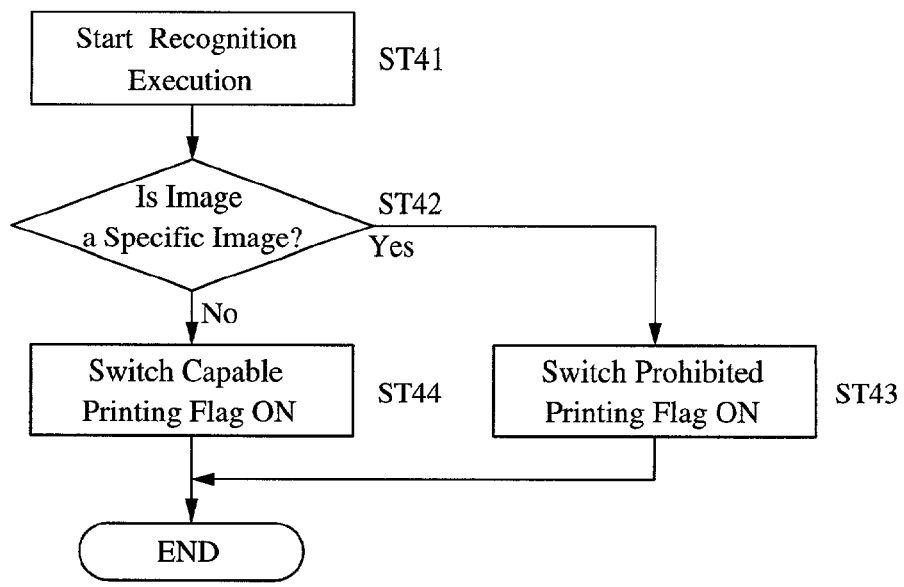
(b)
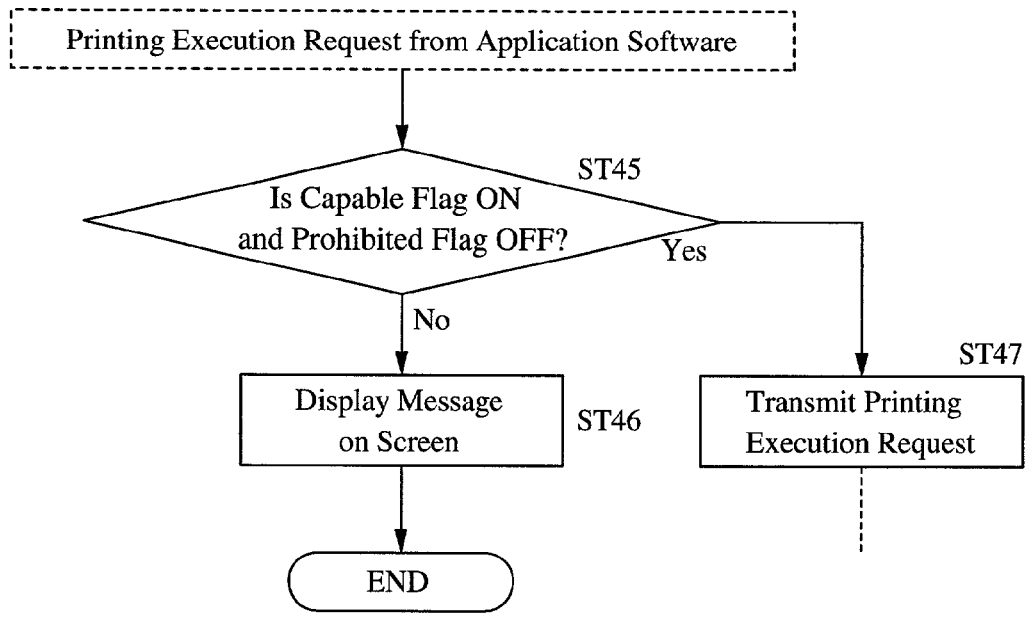

IMAGE RECOGNITON DEVICE, PERIPHERAL DEVICE CONNECTED WITH IMAGE RECOGNITION DEVICE, AND IMAGE PROCESSING SYSTEM

TECHNICAL FIELD

The present invention is related to an image recognition device, a peripheral device connected with the image recognition device, and an image processing system. More specifically, the present invention is related to technology which makes it possible to effectively control the output of prohibited output items.

PRIOR ART TECHNOLOGY

In prior art image processing systems for opposing the counterfeiting of banknotes, valuable securities and the like, various devices have been proposed and implemented in closed systems, such as color copying machines, from image input to image formation. In such closed systems, a recognition is carried out using data read out from the genuine document (prohibited copying item such as a banknote or the like) in the image input portion, and using these results the output is stopped in the image formation device.

On the other hand, with the advent of high-performance, low-cost image scanners, personal computers, printers and the like in recent years, counterfeiting on open systems has become a social problem. Namely, a genuine document is read in using an image scanner, and this read-in image data is stored in a personal computer. The image data stored in this personal computer is supplied to a color printer. Then, this color printer forms images for output based on the received image data, and carries out a printout. In such cases, the image data stored in the personal computer can be sent from a scanner connected to the personal computer, acquired via communication, or supplied via a recording medium such as FD, MO and the like. Accordingly, in this type of open system, image formation of image data having unknown origin is frequently carried out, and in such cases it is also necessary to stop outputs.

In one example method of stopping such improper outputs in open systems, the recognition device provided in prior art color copying machines is installed as is in the image formation device. However, because inkjet printers, image scanners and the like have progressively become extremely low-priced in recent years, the expensive recognition system used in color copying machines cannot possibly be installed as is.

Further, in current systems for stopping improper copying, methods such as painting over the output images to make them unusable when a specific document is recognized are employed. However, this takes a lot of printing time for an inkjet printer, and because the consumption of ink is intense, this method is not suitable.

It is an object of the present invention to provide an image recognition device, a peripheral device connected with the image recognition device, and an image processing system which make it possible to detect prohibited output items and stop normal output when a printout is carried out via an image formation device connected to a computer, and which make it possible to efficiently inform the user and the like that an item is a prohibited output item.

SUMMARY OF THE INVENTION

The image recognition device according to the present invention is provided in a computer for processing image data, and is constructed so as to include a storage portion for storing a recognition program for judging whether or not image data of a processing object is a prohibited output item, and an arithmetic processing portion for executing the recognition program stored in the storage portion in order to carry out a recognition process on the image data. In the embodiments, the storage portion corresponds to the printer driver 21, the scanner driver 21', the driver 21" and the like.

In the present invention, a peripheral device such as an image forming device (printer), image input device (scanner, digital camera or the like) or the like is viewed as almost always being used while connected to a computer such as a personal computer or the like, wherein a recognition process to determine whether or not there is a prohibited output item is carried out using the computer connected to the peripheral device (image input device, image forming device or the like), and in the case where a prohibited output item is recognized, a normal printing is finally stopped. In this way, because the computer carries out the actual recognition process, there is no need to provide a system exclusively used for recognition in the peripheral device such as an image forming device or image input device or the like, and this keeps the cost of the peripheral device from increasing due to the provision of a system for preventing improper output.

Further, because the computer is provided with a high-performance arithmetic processing portion (CPU), by executing the recognition program using this CPU, it is possible to carry out a recognition process quickly. Namely, a CPU or the like of a computer is preferably used in the arithmetic processing portion. Of course, it is also possible to separately provide an arithmetic processing portion for the recognition process.

Further, the recognition program stored in the storage portion can be transferred from an image forming device for outputting image data, and then loaded. Further, the peripheral device for executing the transfer of image data according to the present invention is connected to a computer, and can be constructed so as to include a storage portion for storing a recognition program for judging whether or not image data of a transfer object is a prohibited output item, and a function for transferring the recognition program to the computer. In such case, the recognition program may be stored in a state in which a security system is applied. As for the state in which a security system is applied, for example, encoding can be carried out to make it impossible to carry out decoding from the outside, security can be provided in the chip itself to make it impossible to read out the recognition program, or other various methods may be employed.

In the case of an open system like a computer such as a personal computer or the like, there are various connected peripheral devices such as an image forming device or image input device or the like. In this regard, in order to carry out a recognition process suited to the connected peripheral device and a process for prohibiting normal output, preferably the recognition program in each peripheral device is used.

In this regard, by providing each peripheral device with a recognition program in itself, and by loading and installing this in the computer, it is possible to carry out a recognition process in an optimum environment. Further, it is possible to provide the recognition program without that much of a corresponding increase in the cost of the peripheral device.

Furthermore, the direction of image transfer includes the case where transfer is carried out to the computer, and the case where transfer is carried out from the computer. The former case corresponds to an image input device for example, and the latter case corresponds to an image forming device for example.

Further, the timing for carrying out loading may be before the printing/reading time, or at the time the peripheral device is connected. Furthermore, installation may be carried out at any other timing.

Further, it is possible to provide a function which loads the recognition program at the time image data is transferred (including the case of transfer from an image input device and the case of transfer to an image forming device), and uninstalls the loaded recognition program after the recognition process is completed. When a program (software, application) is kept in an installed state inside the computer, there is the risk that an internal analysis will be carried out, but when uninstalling is always carried out, there is strength against hacking.

Furthermore, it is possible to include a function for outputting and displaying a message on a monitor controlled by the computer in the case where the result of executing a recognition process with the arithmetic processing portion indicates that a prohibited output item is detected.

Namely, for users who accidentally output prohibited output items such as banknotes and the like without intentionally carrying out an improper output, when the recognition program is executed and a prescribed prohibition of normal output is carried out, the output in the state intended by the user is not carried out, and a phenomenon is generated such as outputting an image having a changed shape or lowered image resolution, painting over one portion or the entire portion of the sheet, or not carrying out an output, but there is a risk that this phenomenon will be misjudged to be a malfunction of the image forming device or the like. In this regard, by outputting a message on the monitor, it is possible to give notice that this was a process to prohibit normal output and not a malfunction.

In particular, in the case where the image forming device is the type that uses a printing head to carry out printing one prescribed line at a time such as an inkjet or bubble jet, sublimation type or the like, when a process to prohibit normal output such as painting over one surface or the like is carried out, a large quantity of ink or the like is used, and in addition to such economical concern, it takes a long time for printing.

In this regard, the most effective approach is to cut off the power supply to stop the printing process itself of the printer. Then, in the case where a function is provided for outputting and displaying a message on a monitor controlled by the computer in the case where a prohibited output item is detected, because a user will understand at a glance that there is no malfunction even when a printout from the image forming device is not carried out, such arrangement is preferred. Further, as a process for prohibiting normal output, it is also possible to just eject a sheet that has not been completely printed. Namely, because there are many instances where a sheet for the time a printout is carried out has already been fed to the printing position at the time when the recognition process is completed, it is possible to just eject the sheet when the printing stop is carried out. This case also makes it possible to understand that there is no malfunction.

The image processing system according to the present invention is constructed so as to include an image forming device and a computer for outputting image data to the image forming device, wherein one of the various image recognition devices of the present invention is provided in the computer, and the image forming device executes a process to prohibit normal output in accordance with a prohibited output command outputted from the image recognition device provided in the computer.

Another image processing system according to the present invention is constructed so as to include a personal computer provided with one of the various image recognition devices of the present invention, and the peripheral device according to the present invention connected to the computer, wherein a dictionary portion is not provided in the recognition program stored in the peripheral device, a dictionary is provided in the computer, and a recognition process is executed using the dictionary after the recognition program is transferred to the computer. When such structure is employed, because it is easy to also replace the dictionary with the newest version when the driver is replaced (version upgrading or the like), the detection accuracy is further improved.

Further, another image processing system according to the present invention is constructed so as to include a personal computer provided with one of the various image recognition devices of the present invention, and a peripheral device connected to the computer, wherein a function for detecting whether or not a recognition program is stored in the peripheral device is provided in the computer. This is achieved by the embodiment shown in FIG. 18, FIG. 19. Further, this function for detecting whether or not a recognition program is stored in the peripheral device corresponds to the "check function" in the embodiments.

In this way, it is possible to know whether or not there is a recognition program in the peripheral device. Accordingly, in the case where a recognition program is not provided, for example, by displaying a warning message, a preventative result can be achieved. Further, in the case where a recognition algorithm is not stored, it is also possible to not carry out operations.

Further, with the structure described above as a precondition, it is also possible to provide a simple recognition program in the computer, wherein the simple recognition program is executed when the check function judges that a recognition program is not stored in the peripheral device. When there is a simple recognition program, in the case where it is assumed that it is not possible to acquire a recognition program corresponding to the peripheral device, it is possible to carry out a simple check by this simple recognition program.

Furthermore, in the case where the simple recognition program is executed and the image data of the processing object is judged to appear to be a prohibited output image, it is possible to output a warning message on a display device connected to the computer. The preventative result is further improved. This is achieved by the embodiments shown in FIG. 20~FIG. 23.

On the other hand, another image processing system according to the present invention is constructed so as to include a personal computer provided with one of the various image recognition devices of the present invention, and an image input device and an image forming device connected to the computer, in which image data acquired by the image input device is transferred to the computer, the transferred image data is transferred to the image forming device, and printing is carried out by the image forming device, wherein the result of the image recognition process carried out at the time image data is transferred from the input device to the computer is used at the time image data is transferred from the computer to the image forming device.

By using the result of the image recognition process carried out at the time image data is transferred from the input device to the computer, it is possible to efficiently carry out a high-accuracy recognition process. In this regard, in the situation where a recognition process is carried out for both transfers, the use of a result includes an AND process and an OR process for the recognition results of both transfers. In this way, by carrying out a judgment based on a plurality of recognition results, it is possible to make a judgment having a higher accuracy.

BRIEF DESCRIPTION OF THE DRAWINGS

FIG. 12 is a flow chart for describing the function of a printer controller (printer) in the embodiment shown in FIG. 10.

FIG. 13 is a schematic drawing showing another embodiment (encoding) of the present invention.

FIG. 23 is a drawing showing the overall structure of an image processing system showing another embodiment (corresponding to a copy mode) of the present invention.

FIG. 31 is a flow chart for describing a modification of the printer driver (personal computer) in the embodiments shown in FIG. 27 and FIG. 28.

PREFERRED EMBODIMENTS OF THE INVENTION

The present invention will be described in detail with reference to the appended drawings.

Figure 1:
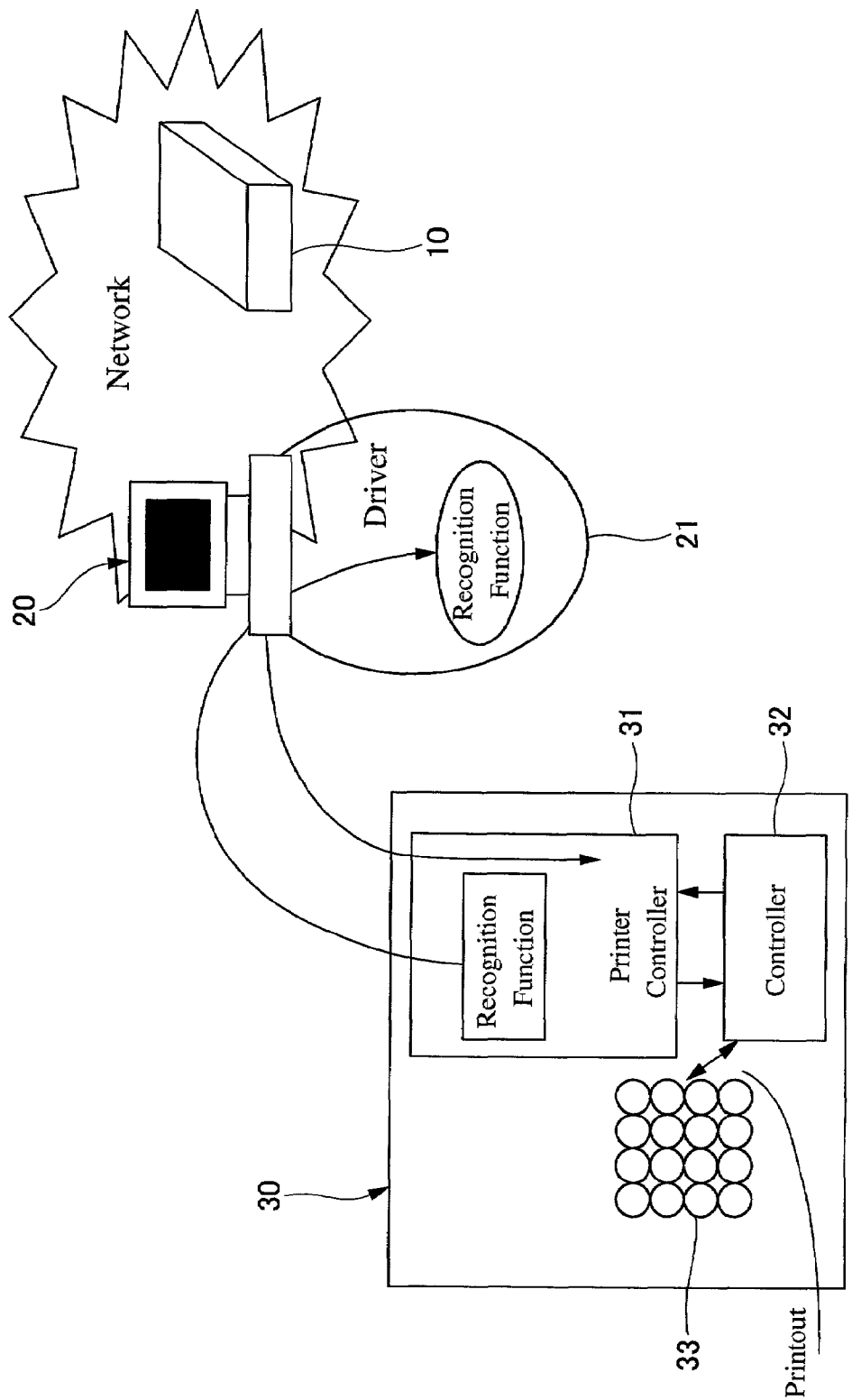
FIG. 1 is a drawing showing the overall structure of an image processing system showing a preferred embodiment of the present invention.

FIG. 1 shows the schematic structure of an image processing system to which the present invention is applied. As shown in the drawing, the document to be read is imaged using a scanner 10 and image data is uptaked. The uptaked image data is transmitted to the main portion of a personal computer 20, and uptaked in an internal/external storage device of the personal computer 20. This personal computer 20 also serves as a print server and the like for a simple copying machine.

Further, a printer 30 which is an image formation device is connected to the personal computer 20, and after being edited by photo retouching software or the like, or with no editing being carried out, the image uptaked in the personal computer 20 is outputted to the printer 30 for image formation, and then a printout is carried out by printing onto a blank sheet.

Such structure is known in the prior art, and the connection between the scanner 10 and the personal computer 20 may be a direct connection via a cable, or transmission may be carried out via a communication line or network. Furthermore, it is also possible to store the image data read by the scanner 10 in the personal computer 20 via a recording medium such as FD, MO or the like.

Further, in the present embodiment, an inkjet printer is used as the printer 30, and the personal computer 20 uses a printer driver 21 installed in itself, carries out communication with a printer controller 31 of the printer 30, and transmits appropriate shape data for carrying out a printout to the printer 30.

Then, the printer controller 31 sends control commands to a controller 32 based on the received data, and by means of this controller 32 a desired color is jetted from a prescribed nozzle of a head 33 to form and print a prescribed image onto a blank sheet.

Now, in the present invention, a recognition program (recognition function) is internally installed in advance in the printer controller 31 of the printer 30, and this recognition program is transferred to the personal computer 20 when a printout is carried out, wherein a recognition process that uses this recognition program is carried out by the personal computer 20.

Namely, a CPU having a high performance compared with the CPU installed in the printer 30 is installed in advance in the personal computer 20. In this regard, by using this high-performance CPU, even high-speed complex arithmetic processes can be carried out easily. Accordingly, there is no need to install a high-performance and high-priced CPU and recognition unit in the printer 30.

Now, as for the timing of transferring the recognition program, it is possible, for example, to have the printer 30 send a reception command and transfer the recognition program internally installed in itself to the printer driver 21 of the personal computer 20 when the printing execution communication from the personal computer 20 to the printer 30 is started.

Figure 2:
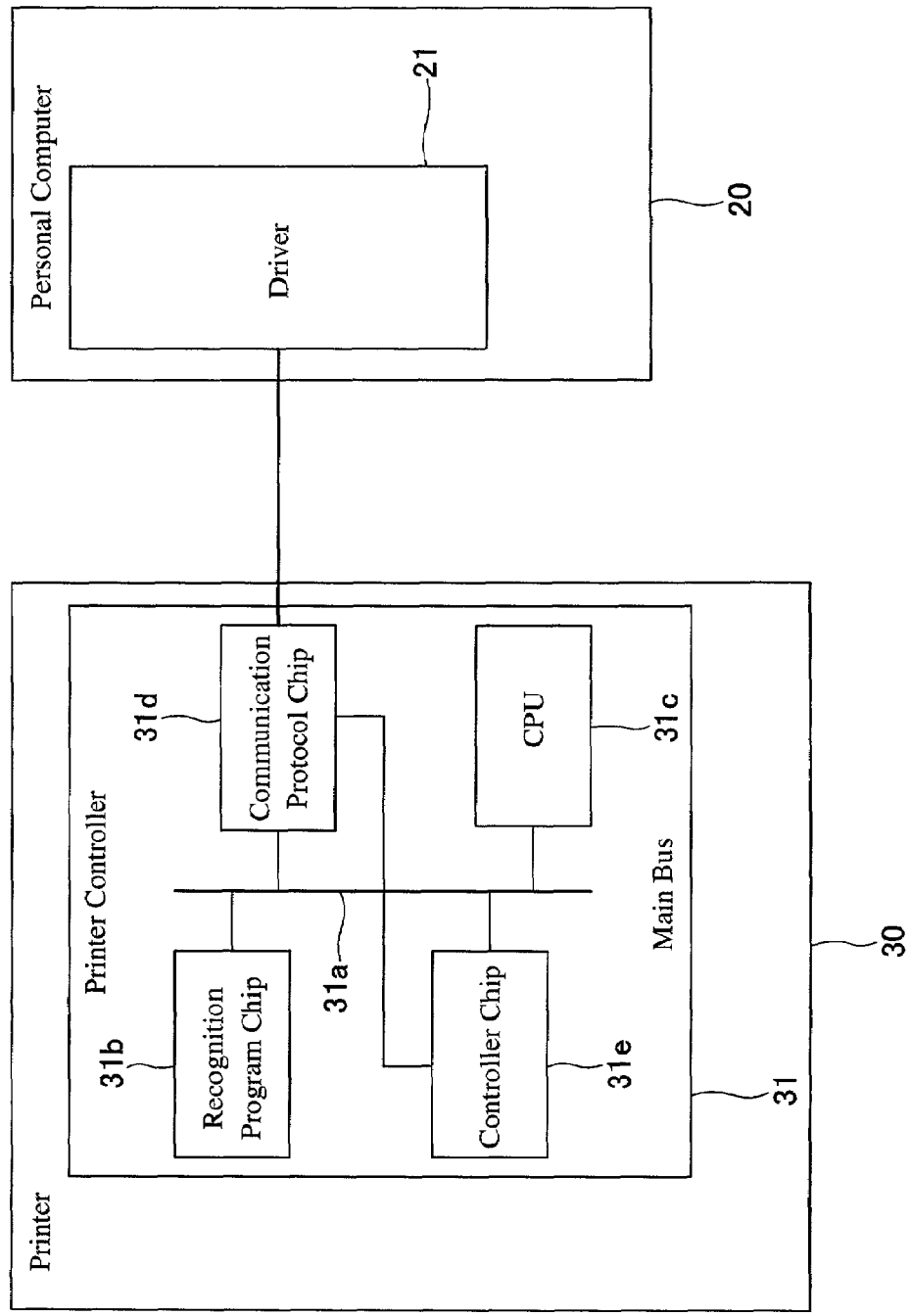
FIG. 2 is a drawing of an internal structure showing an essential portion.

Further, it is possible, for example, to use the structure shown in FIG. 2 as the internal structure of the printer controller 31 for carrying out such process. Namely, a recognition program chip 31b is connected to a main bus 31a, and is capable of communicating with a CPU 31c and a communication protocol chip (e.g., a SCSI protocol controller) 31d. Furthermore, a controller chip 31e is connected to the main bus 31a, and exhibits the function (printout) of a primary printer. Namely, the control of the image process, data transfer to the head portion (engine portion) 33 and the like is carried out by the controller chip 31e.

Furthermore, the recognition program chip 31b is constructed, for example, by a ROM or the like, and an executable program is stored therein. In this regard, in the present embodiment, even though the recognition program chip 31b is constructed using a separate ROM, it is of course also possible to carry out storage in another region of the ROM inside the printer controller 31.

Figure 3:
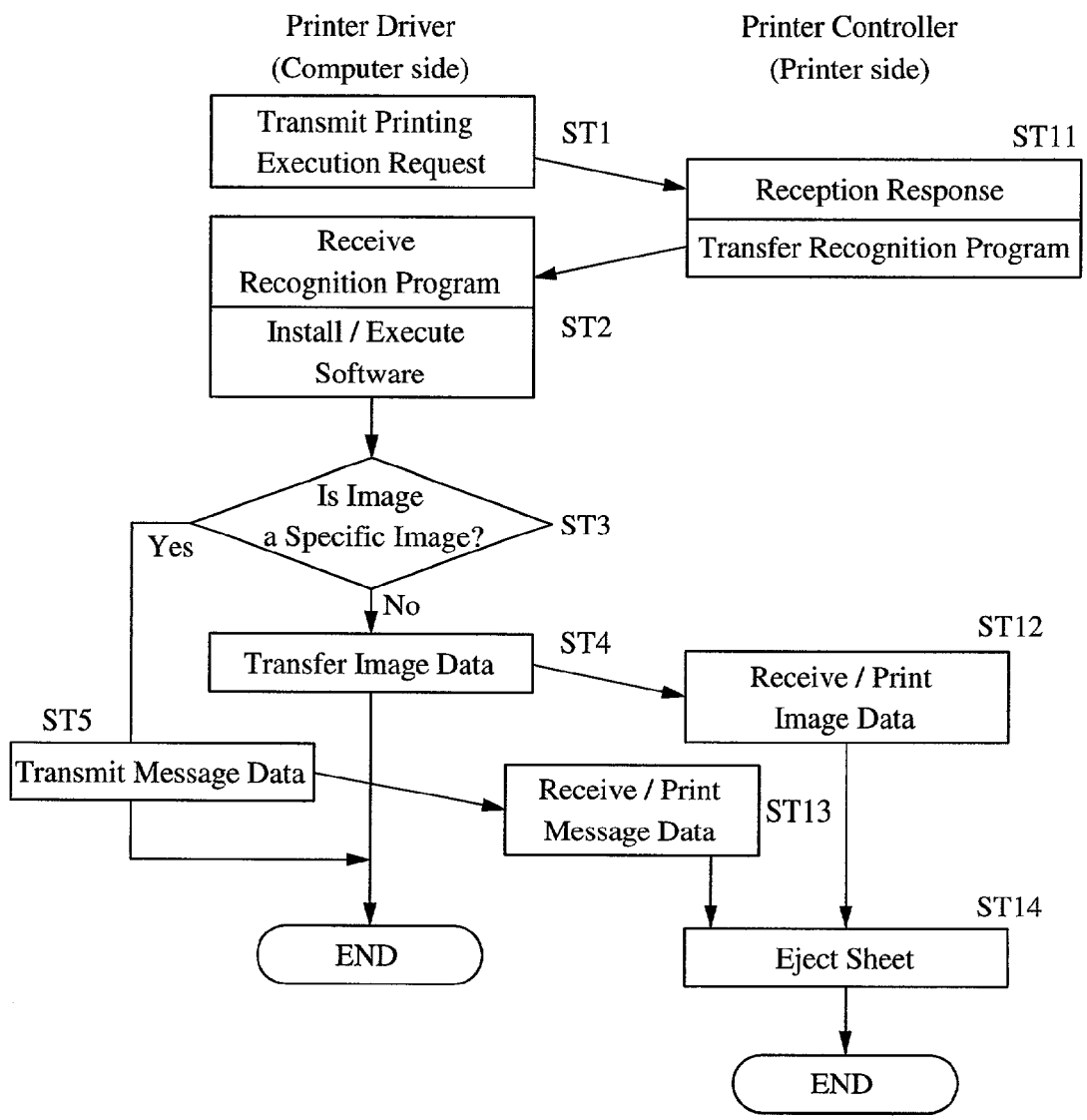
FIG. 3 is a flow chart for describing the function of a printer driver (personal computer) and a printer controller (printer).

Next, while describing an example communication protocol between the printer 30 and the personal computer 20 at the time of an actual printing execution, a description of the functions of each portion will be given. As shown in FIG. 3, in the case where a printing process is to be carried out, first, the printer driver 21 of the personal computer 20 transmits a printing execution request to the printer 30 (ST1).

Upon receiving this request, the printer controller 31 of the printer 30 carries out a reception response and transfers the recognition program stored in the recognition program chip 31b to the printer driver 21 via the communication protocol chip 31d (ST11).

At the printer driver 21 side, the transferred recognition program is immediately installed, and a judgment of whether or not the image data to be printed is a specific image is carried out (ST2, ST3). In the case where the judgment result indicates the image is not a specific image, an image transfer to the printer 30 is carried out (ST4). Then, when the printer 30 receives the image data, the controller chip 31e is activated, a normal printing process is carried out, and then a printed sheet is ejected (ST12, ST14).

On the other hand, in the case where the image is judged to be a specific image at the branching judgment at Step 3, the printer driver 21 transmits message data indicating that the image is a prohibited printing document to the printer (ST5). Then, after receiving this message data, the printer carries out printing by a prohibited output process that does not allow normal output, and such sheet is ejected (ST13, ST14). As for this prohibited output process, it is possible, for example, to transmit and print a reduced image for the purpose of confirmation, or it is possible to carry out printing at a lowered resolution to enable a counterfeit item to be understood at first glance. Further, such altered image may be printed together with a message.

In this way, by having the judgment of whether or not an image is a specific image (prohibited output item) carried out at in personal computer 20, because image data for a normal output is transferred to the printer in the case where the image is not a specific image, and because image data on which a prescribed image process (alteration, lowered resolution, attached text and the like) is carried out is sent in the case where an image is a specific image, it is possible to reliably carry out a prohibited output process even in the case where, for example, the printer 30 carries out printing a prescribed line at a time while moving the head 33 like an inkjet printer.

Further, in accordance with the change toward high-performance personal computers in recent years, even when a recognition process is carried out in the CPU of the personal computer before transferring image data to the printer, because such recognition process can be completed in a short time, the waiting time is not long enough to bring discomfort to the user.

Figure 4:
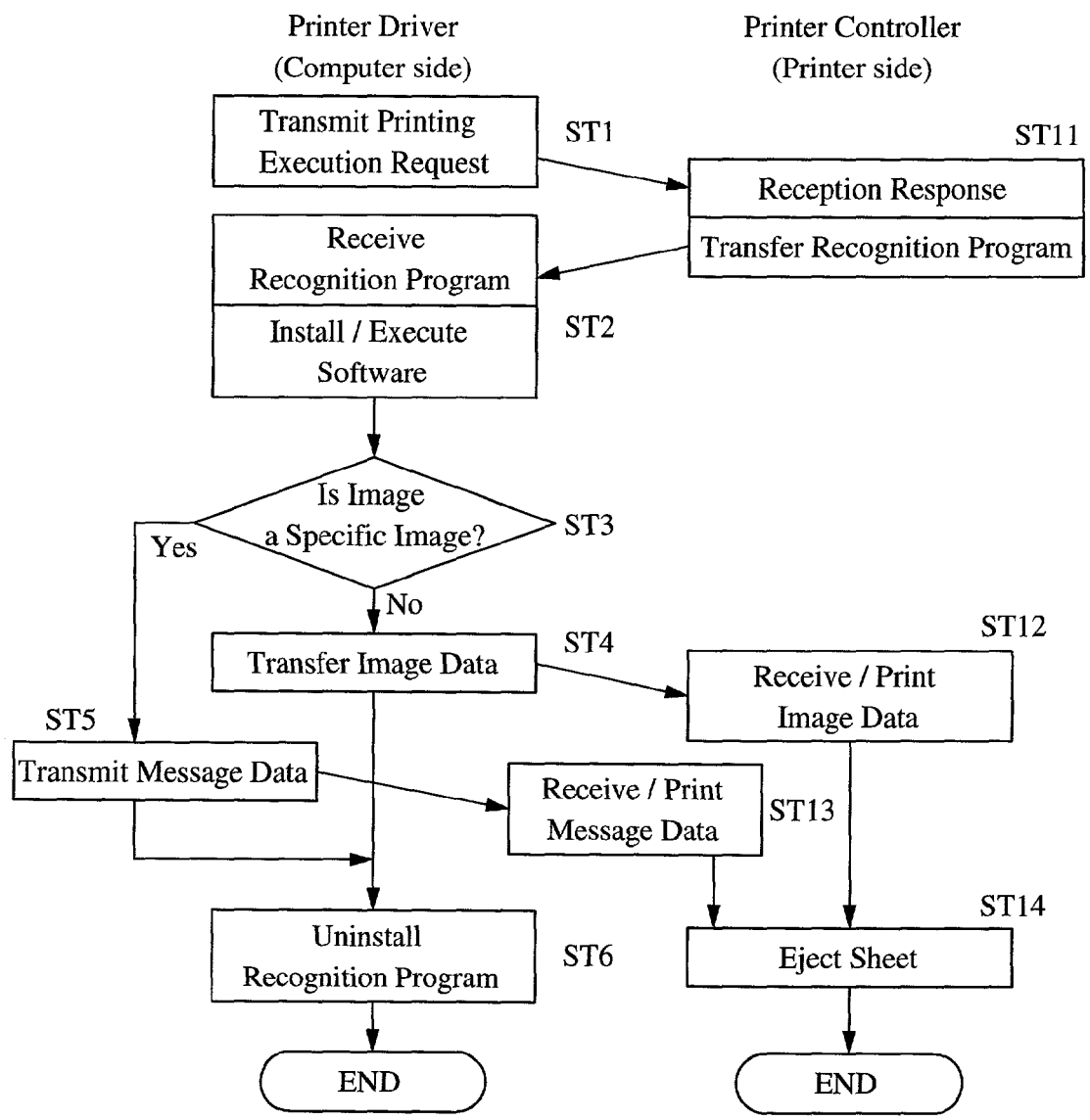
FIG. 4 is a flow chart for describing the function of a printer driver (personal computer) and a printer controller (printer) which show a modification of the embodiment of FIG. 3.

Next, FIG. 4 shows the essential portion of another embodiment of the present invention. Namely, using the portions that have the functions of the flow chart shown in FIG. 3 as a base, an improvement is made to the printer driver 21 of the personal computer 20. The same function portions are assigned the same step numbers, and a description will be given only for those points that are different.

In the present embodiment, an uninstall function for the recognition program is added. Namely, after executing the recognition program received at Step 2 and carrying out a judgment of whether or not an image is a specific image, data is outputted to the printer in accordance with such judgment results, and then the received recognition program is uninstalled (ST6). In this way, it is possible to prevent hacking due to the recognition program remaining in the personal computer (printer driver).

Figure 5:
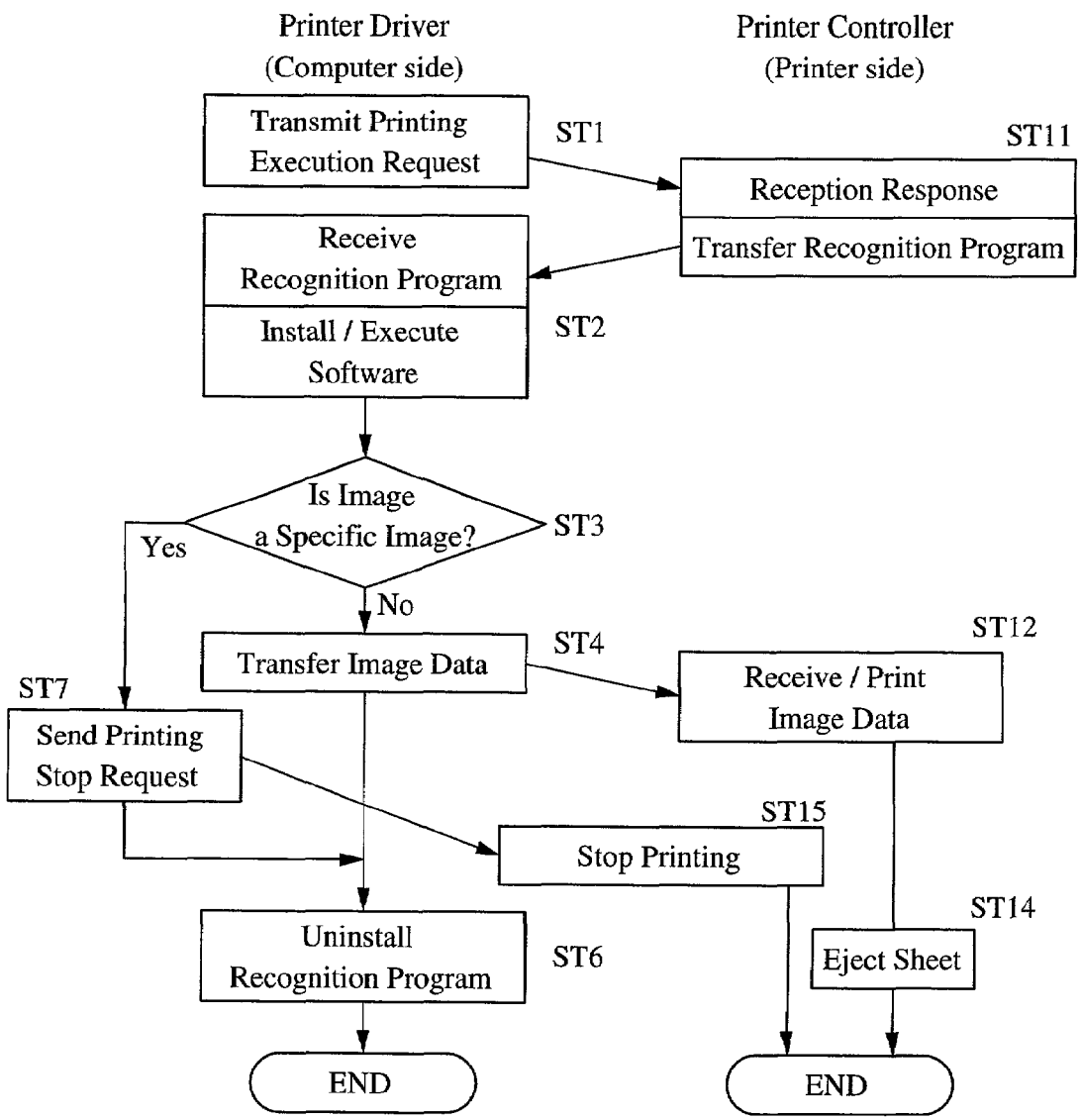
FIG. 5 is a flow chart for describing the function of a printer driver (personal computer) and a printer controller (printer) which show another embodiment of the present invention.

Next, FIG. 5 shows the essential portion of another embodiment of the present invention. Namely, using the portions that have the functions of the flow chart shown in FIG. 4 as a base, if the points of change are described, in the case where a specific image is detected, instead of giving a message such as a warning or the like or carrying out a printout of an altered image, the printing process itself is stopped.

Specifically, with regards to the function of the printer driver 21, a judgment of whether or not an image is a specific image is carried out (ST3), and in the case where an image is a specific image, instead of image data, a printing stop request is sent out (ST7). Of course, in the case where an image is not a specific image, normal image data is transferred (ST4).

On the other hand, with regards to the function of the printer controller 31, in the case where image data is received from the printer driver, printing is carried out as is, and a printed sheet is ejected (ST12, ST14), but when a printing stop request is received, no printing is carried out (ST15). Then, without ejecting a sheet, the process is terminated. Further, the blank sheet may be ejected as is.

Further, in the example shown in the drawings, the printing driver has the function of uninstalling the recognition program, but for the type that outputs a printing stop request like that of the present embodiment, an uninstall function may not be provided as shown in FIG. 3.

Figure 6:
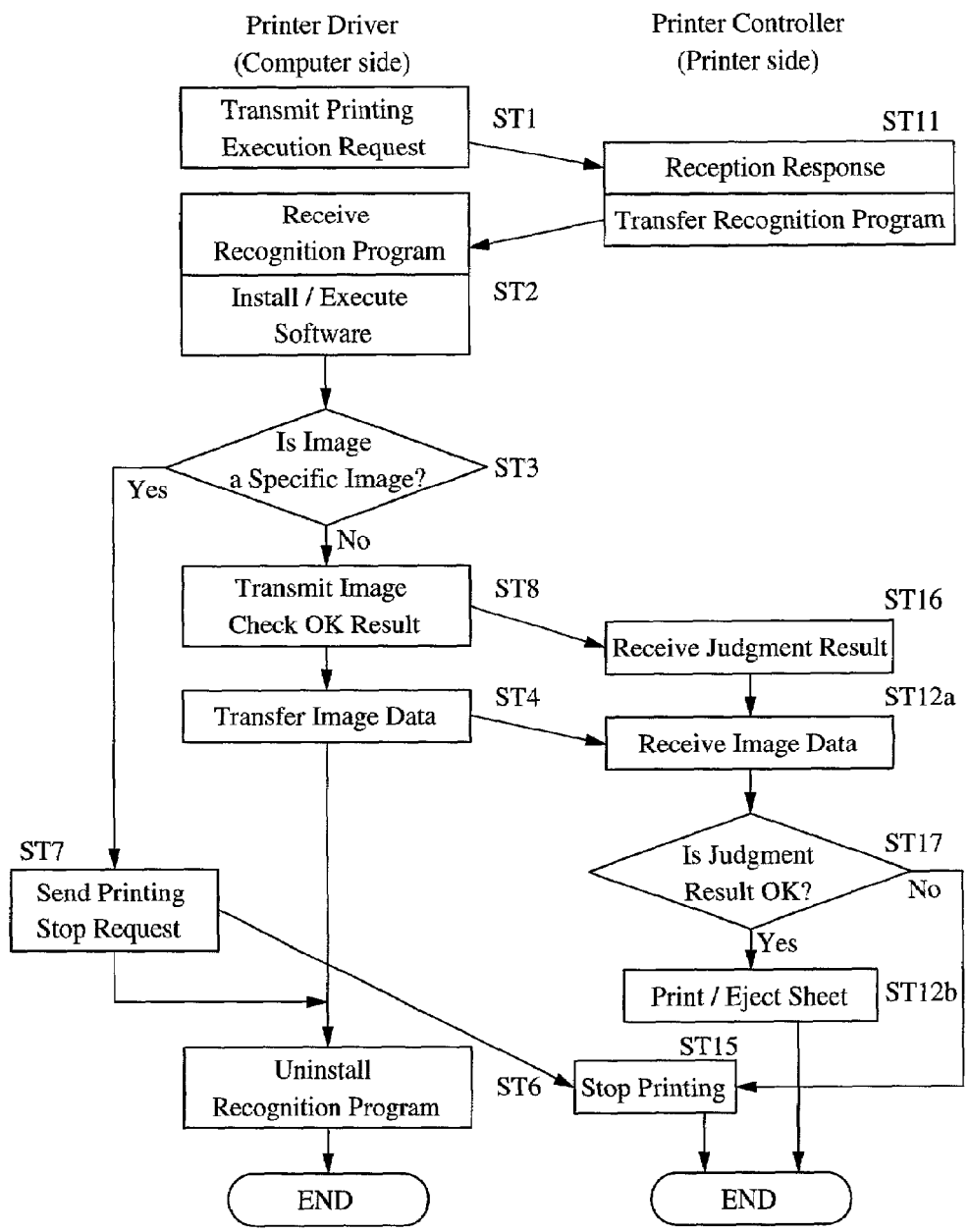
FIG. 6 is a flow chart for describing the function of a printer driver (personal computer) and a printer controller (printer) which show another embodiment of the present invention.

FIG. 6 shows another embodiment, wherein the embodiment shown in FIG. 5 is used as a base, with a further function being added. Namely, in the present embodiment, a function is added for the case where a specific image is not detected, wherein the printer driver 21 has the function of executing a recognition process in accordance with the received recognition program (ST2), and in the case where the result of the specific image judgment indicates an image is not a specific image (printing OK), first, after transmitting such result (image check OK) to the printer (ST8), image data is transferred to the printer (ST4).

On the other hand, the function of the printer controller 31 (printer 30) is to receive image data (ST12a) after receiving judgment results (ST16) in the case of normal operations. In this regard, when the image data to be printed is received from the printer driver 21, instead of immediately carrying out printing, a judgment of whether or not a "judgment result OK" has been received is carried out (ST17). Then, in the case where reception occurs (Yes), a normal printout operation is carried out, namely, the contents of the received image data are printed, and such sheet is ejected (ST12b).

On the other hand, in the case where a "judgment result OK" has not been received, a printing process is not carried out, and a printing stop process is carried out (ST15). Of course, a printing stop process is also carried out (ST15) in the case where a printing stop request outputted in the case where a specific image is detected by the printer driver is received (ST7).

In this way, in the present embodiment, before the final printing in the case where a specific image was not detected, the printer carries out a confirmation of "the absence of a recognition result problem." By doing this, it is possible to prevent printing in the case where some sort of hacking is carried out to avoid the recognition program in the driver. Furthermore, the other structures and operation results are the same as those of the embodiment shown in FIG. 5 described above. Moreover, it is possible to make such changes to the embodiments shown in FIG. 3 and FIG. 4.

Figure 7:
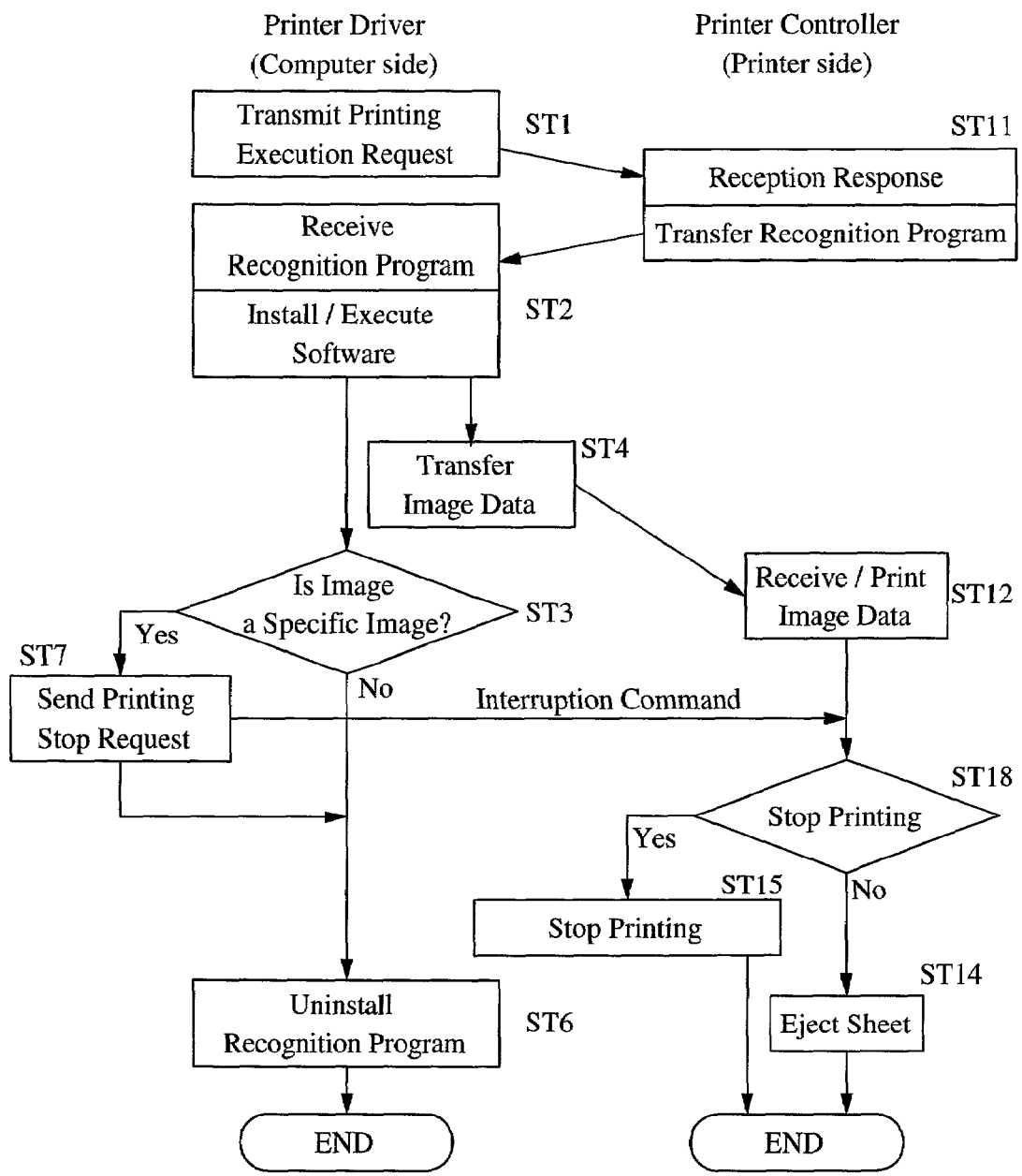
FIG. 7 is a flow chart for describing the function of a printer driver (personal computer) and a printer controller (printer) which show another embodiment of the present invention.

FIG. 7 shows another embodiment of the present invention. In all of the embodiments and modifications described above, image data is transferred after carrying out a recognition process (ST2, ST3) to determine whether or not an image is a specific image, but in the present embodiment image transfer is carried out in parallel with the execution of the recognition program.

Namely, because printing is not started until a judgment is carried out while the driver executes the recognition program, printing is delayed by the amount of time for carrying out the recognition process. With respect to personal computers capable of performing high-speed processes, this kind of delay will be disadvantageous to the large majority of users not doing anything wrong. In this regard, in the present embodiment, the driver carries out recognition while a printing sequence is executed in the same way as normal.

Specifically, after the printer driver receives and installs the recognition program, when execution is started (ST2), the transfer of image data is started (ST4) without waiting for the judgment of whether or not a specific image is detected. Then, in the case where the results of the recognition process indicate that a specific image was detected (Yes at the branching judgment at Step 3), a printing stop request is sent to the printer (ST7). Further, after transmitting such printing stop request, or in the case where a specific image was not recognized in the end (No at the branching judgment at Step 3), the recognition program is uninstalled (ST8), and the process of the printer driver is terminated.

On the other hand, when the printer controller receives image data, a sequential printing is executed (ST12). Then, when a printing stop request interruption command is received from the printer driver during such printing process, the printing is stopped (ST18, ST19). Further, in the case where a printing stop request was not received in the end, the printing process of Step 12 is executed as is, and a printed sheet is ejected (ST14).

Furthermore, because the other structures and functions are the same as those of the embodiments described above, the same step numbers are assigned to corresponding portions, and a detailed description thereof is omitted. Of course, it is possible to also make changes to the present embodiment, such as not carrying out uninstalling, not carrying out a printing stop, and printing an irregular image that has been altered.

Figure 8:
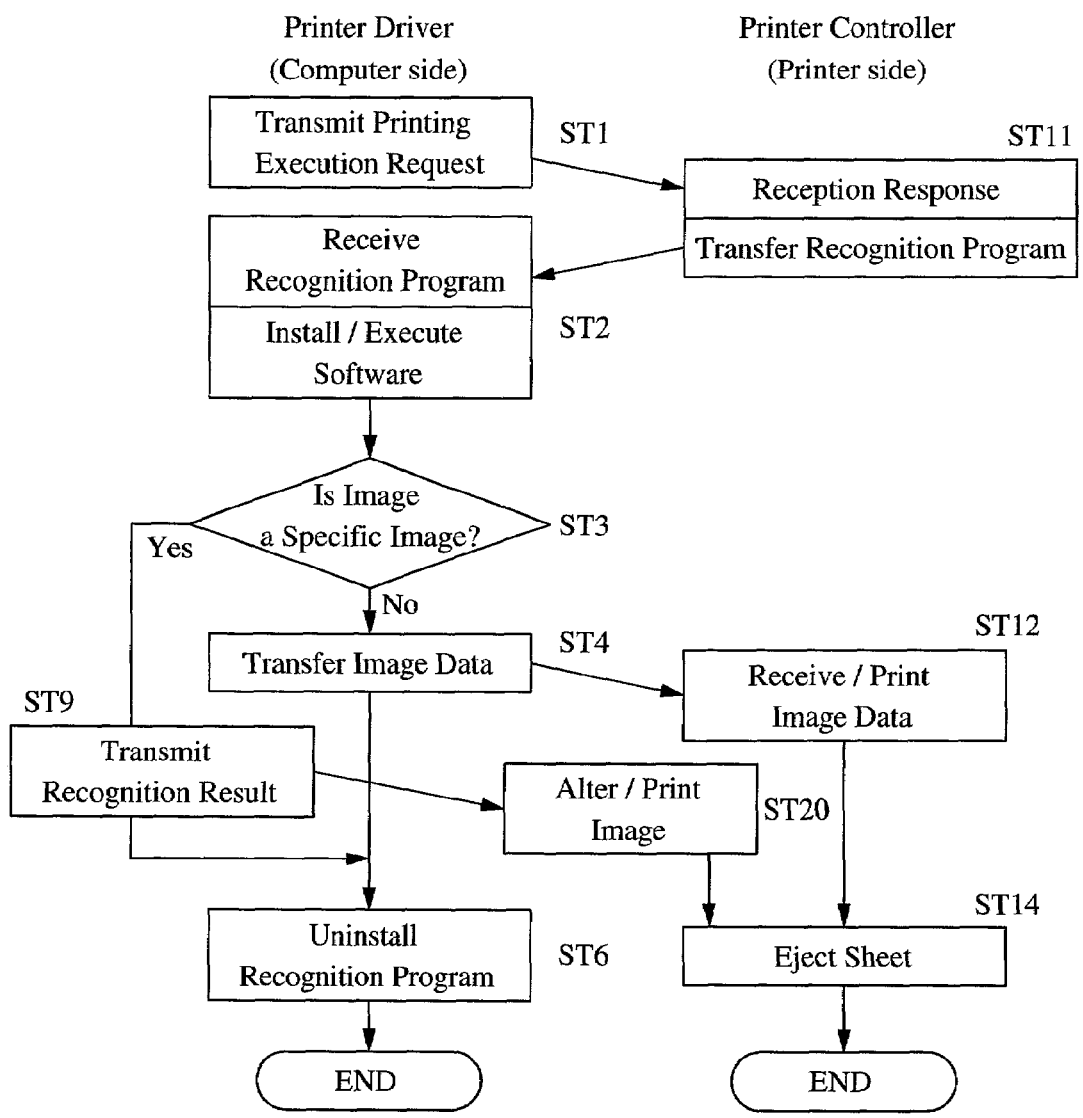
FIG. 8 is a flow chart for describing the function of a printer driver (personal computer) and a printer controller (printer) which show another embodiment of the present invention.

FIG. 8 shows another embodiment of the present invention. In the present embodiment, in the case where a specific image is detected, irregular image data is printed, and a printout is carried out, but the data for creating the altered image for such printout is held in the printer.

Namely, when the printer driver detects a specific image, such result, namely, a recognition result (specific image detection regular output prohibition command) is transmitted (ST9). Then, when the printer 30 receives the recognition result indicating that a specific image has been detected, without stopping the printing, the printer processes the image, namely, one surface of the sheet is covered with cyanine ink or the like, and it is possible to paint over by covering one surface with a specified ink.

Further, even in the case where a specific image is detected, in the case where the recognition result indicating such detection is transmitted together with the image data to be outputted (the transfer timing of the image data may be simultaneous with the transmission of the recognition result, or may be shifted before or after), the image altering process may carry out a process to lower the resolution at the time of output, enlarge/reduce the image or the like. Furthermore, with the image data left roughly as is, various situations can be employed, such as printing being combined with a tracking pattern that makes it possible to later identify the device where printing was carried out, or printing being combined with a warning text placed above the image.

Figure 9:
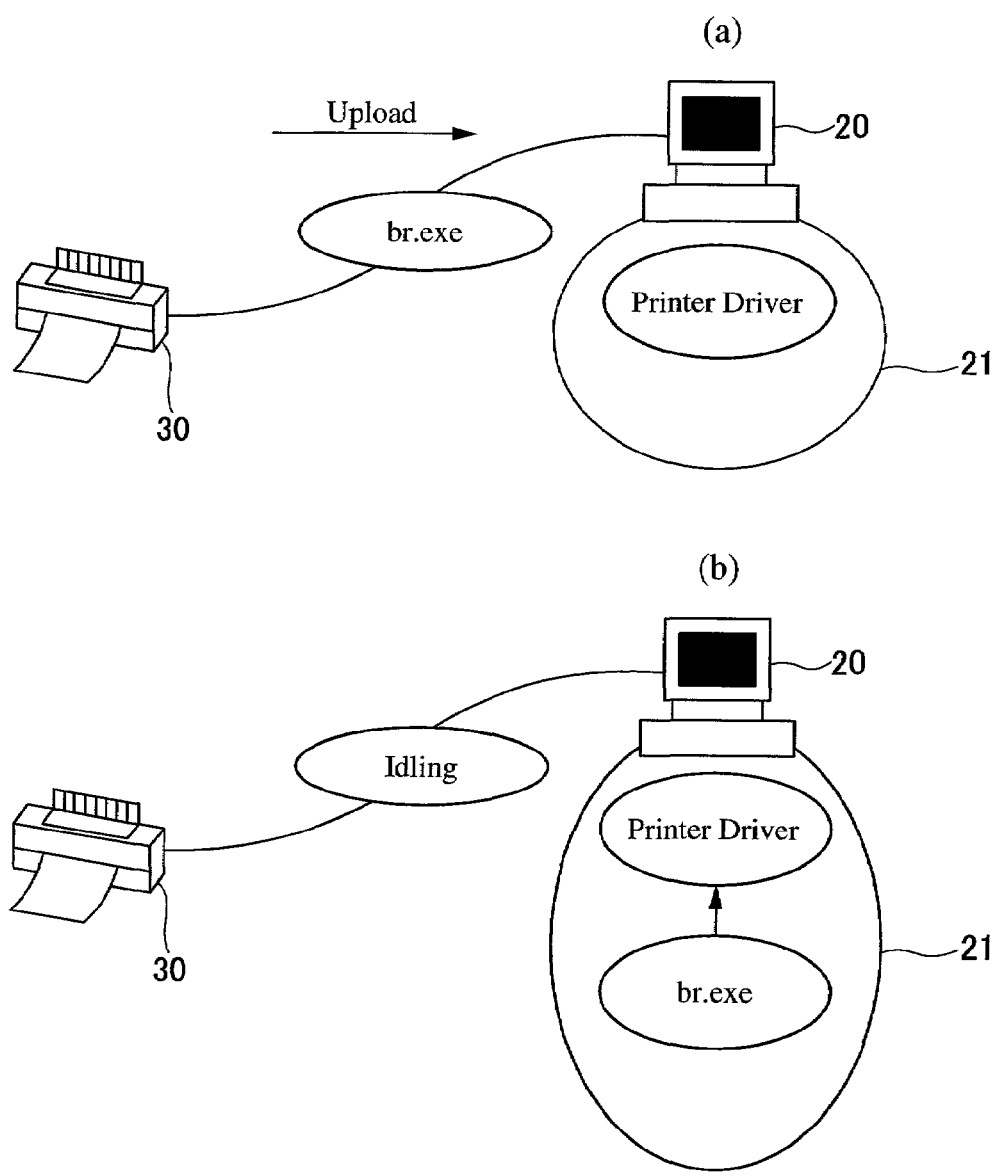
FIG. 9 is a schematic drawing showing another embodiment of the present invention.

FIG. 9 shows another embodiment of the present invention. In the embodiments and modifications described above, the issuance of the printing execution request is received from the personal computer 20 (printer driver 21) and the transfer of the recognition executable program is received from the printer 30 (printer controller 31), but in the present embodiment, as shown in (a) of the same drawing, the recognition executable program (br. exe) is transferred at the point in time where the printer 30 makes a connection with the personal computer 20, and uploading is carried out in the personal computer 20. Then, as shown in (b) of the same drawing, in the personal computer 20, during the time the uploaded recognition executable program is being uptaked (joined) in the printer driver 21, the printer 30 is in an idling state.

In this way, because there is no need to transfer and install the printing executable program each time printing is carried out, it becomes possible to carry out quick processes. Thereafter, the recognition program is executed at a prescribed timing in the same manner as that of the embodiments described above.

Figure 10:
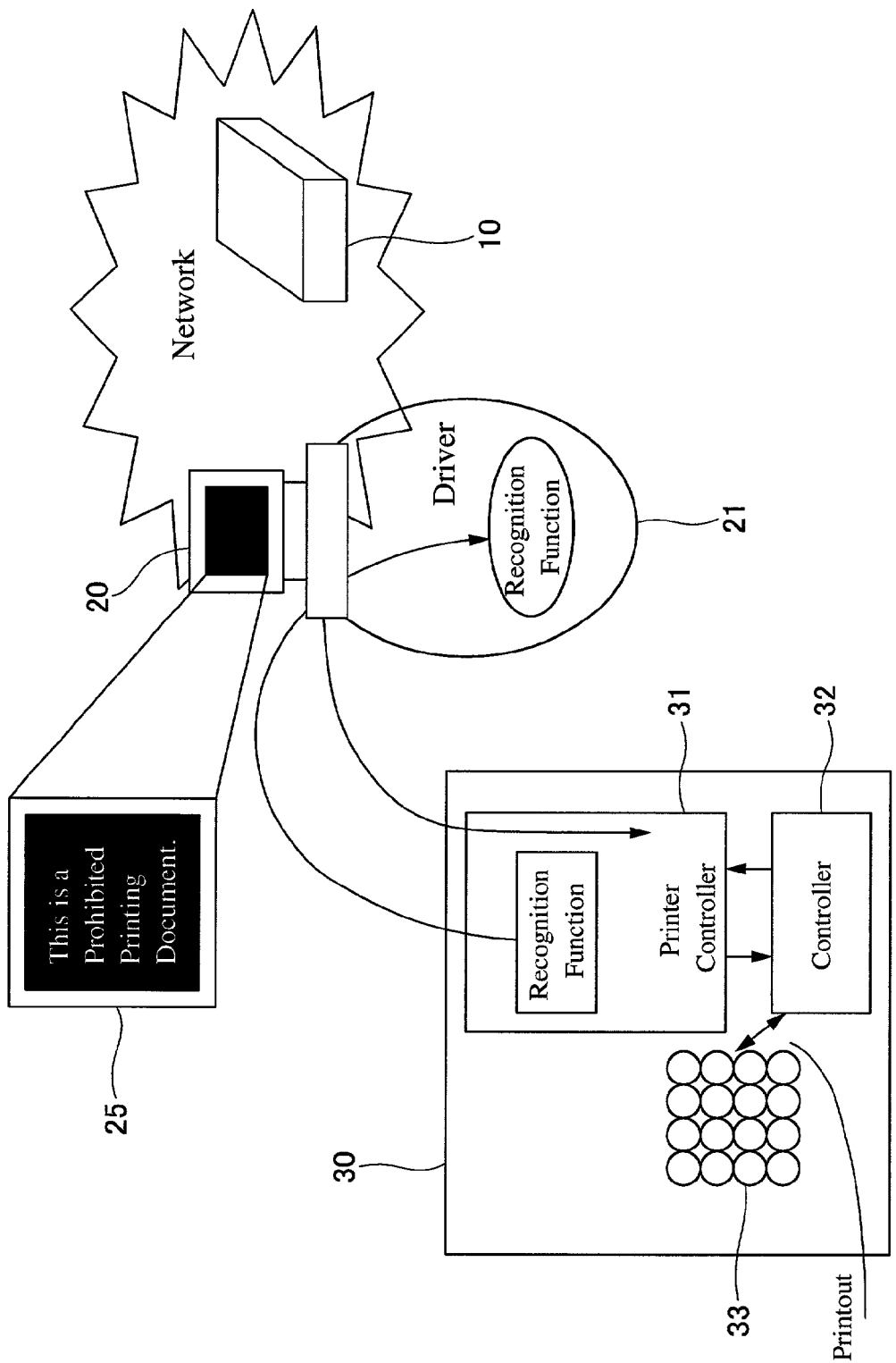
FIG. 10 is a drawing showing the overall structure of an image processing system showing another embodiment of the present invention.
Figure 11:
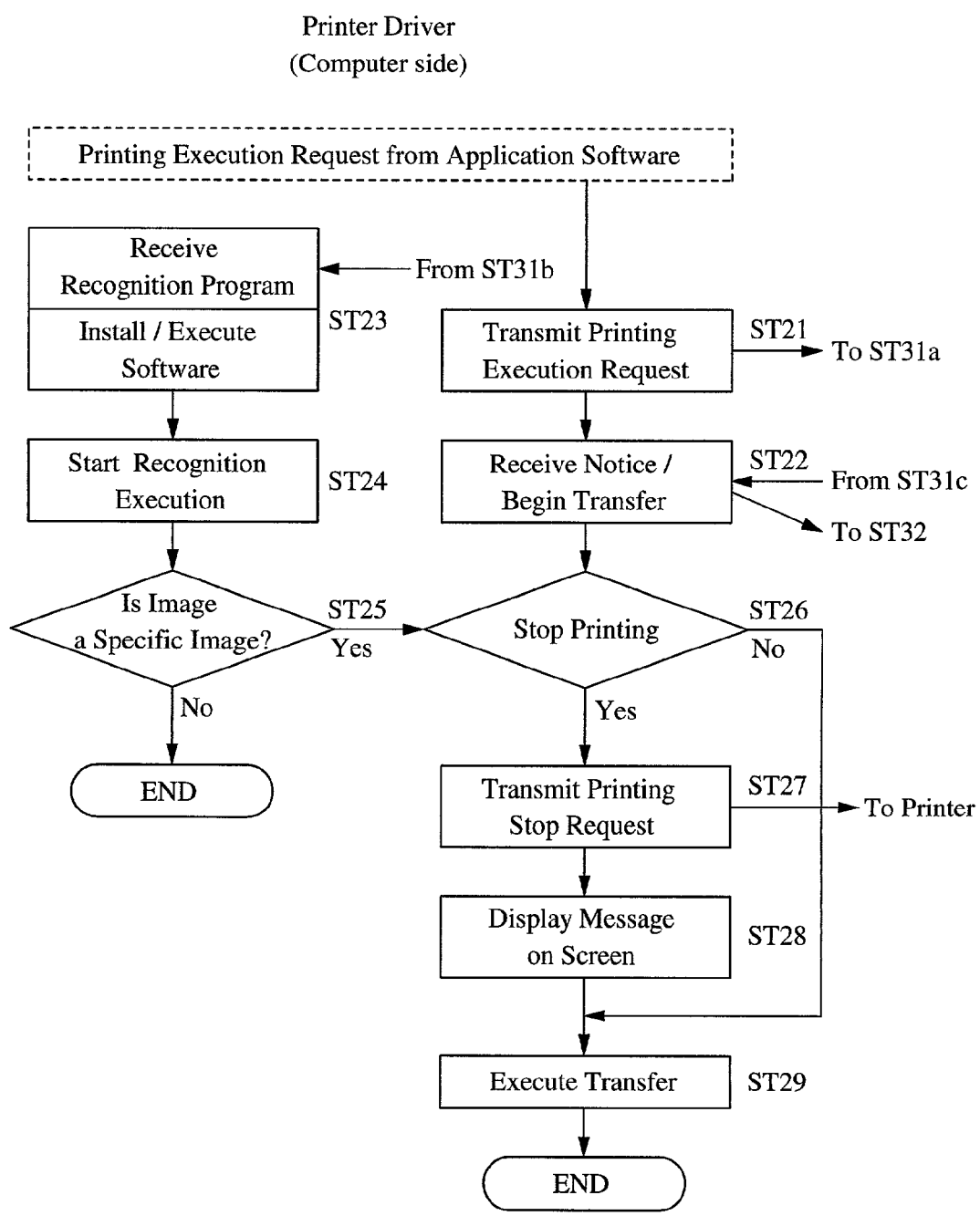
FIG. 11 is a flow chart for describing the function of a printer driver (personal computer) in the embodiment shown in FIG. 10.

FIG. 10~FIG. 12 show another embodiment of the present invention. In the present embodiment, the embodiments described above are used as a base, and in the case where the results of the recognition process carried out by the printer driver of the personal computer indicate that a specific image has been detected, a message is displayed on a monitor 25 of the personal computer 20. Namely, for a user who accidentally tries to carry out a printout of a prohibited output item without thinking of intentionally carrying out an improper use, if the printing is stopped or an altered image is printed and outputted, there is the risk that the user will mistakenly think "Is there a malfunction of the printer or the like?" In this regard, as shown in FIG. 10, by displaying a message such as "prohibited printing image" on the monitor 25, it is possible to know that there is no malfunction.

Now, the functions of the personal computer 20 (printer driver 21) and the printer 30 (printer controller 31) are like those shown in FIG. 11 and FIG. 12. Namely, as shown in FIG. 11, when a printing execution request arrives from an application software or the like, the printer driver 21 transmits the printing execution request (ST21).

Further, because a recognition program and a transfer approval notice are sent in from the printer which receives the printing execution request as described below, when the transfer approval notice is received, the transfer of image data is started (ST22). Further, in parallel with this, the recognition program is received and an installing is executed (ST23). Next, the installed recognition program is executed, and the recognition process is started (ST24). Further, when the recognition process is executed, the start timing of the transfer of image data may be carried out simultaneously at the same time (where image data is not transferred until the installing is carried out), or the image data may be carried out after the recognition process is carried out first.

Then, in the case where the result of the recognition execution indicates that a specific image has been detected, a specific image detection (printing stop) command is provided for the function for transferring image data (ST25). Then, when this interruption is received, because a Yes judgment is made at the branching judgment of Step 26, a printing stop request is transmitted to the printer (ST27). After that, a warning message is outputted to the monitor 25 (ST28). Further, in the case where a specific image is not detected, because there is no interruption command, the transfer of image data is executed to the end (ST29), and then the process is terminated.

On the other hand, with regards to the function of the printer controller 31 (printer 30), as shown in FIG. 12, when the printing execution request is received from the printer driver, the recognition program and the transfer approval notice is sent to the printer driver of the personal computer (ST31), and then the printer controller waits for instructions and data to be sent in from the printer driver.

Next, when image data is sent in, this data is received, and printing is executed (ST32). Then, in the case where there is an interruption command and a printing stop request has been received, a printing stop process is executed (ST33, ST34). Further, in the case where there is no printing stop request, printing is executed (ST35), and a printed sheet is ejected (ST36).

Incidentally, in each of the embodiments described above, the recognition program stored in the printer 30 is preferably encoded. Further, this encoded recognition program is uploaded in the printer driver of the personal computer 20 at a prescribed timing, and by breaking this code at the time of such loading (installing), it becomes possible to execute a normal recognition program. Further, the timing of this code breaking (decoding) is not limited to the above arrangement, and it is also possible to carry out decoding at the time of recognition. In such case, after recognition is completed, encoding is carried out again. In this way, it is possible to eliminate the risk that a third party will output and then analyze and alter the program data stored in the printer 30.

In this regard, it is possible to use a general method for carrying out such encoding. For example, in the case where the proper arrangement of program data is like that shown in FIG. 13(a), the bit arrangement may be rearranged in a regular manner as shown in (b) of the same drawing, or rearrangement may be carried out in an irregular manner using key data like that shown in (c) of the same drawing. In the case where the movement of bits is carried out in such irregular manner, the key data ("51360427" in the case of the drawing) which shows the bit arrangement may be stored in a specific address of the program and then transferred to the driver at the time of uploading, or the key data may be held in advance in the driver, or other such measures may be taken.

Furthermore, in order to improve the security of the programs stored in the printer, in addition to encoding, for example, measures may also be applied to the actual chip that stores programs. Namely, such measures may be easily achieved by using a flash EEPROM equipped with a general method "tamper resistant function." In this regard, the tamper resistant function is a function for preventing improper readout and alteration of the stored data and programs.

Further, the recognition program used in the present embodiment may of course be the same as that used in the embodiments described above, and it is possible to use various programs such as those of the embodiments described below.

Figure 14:
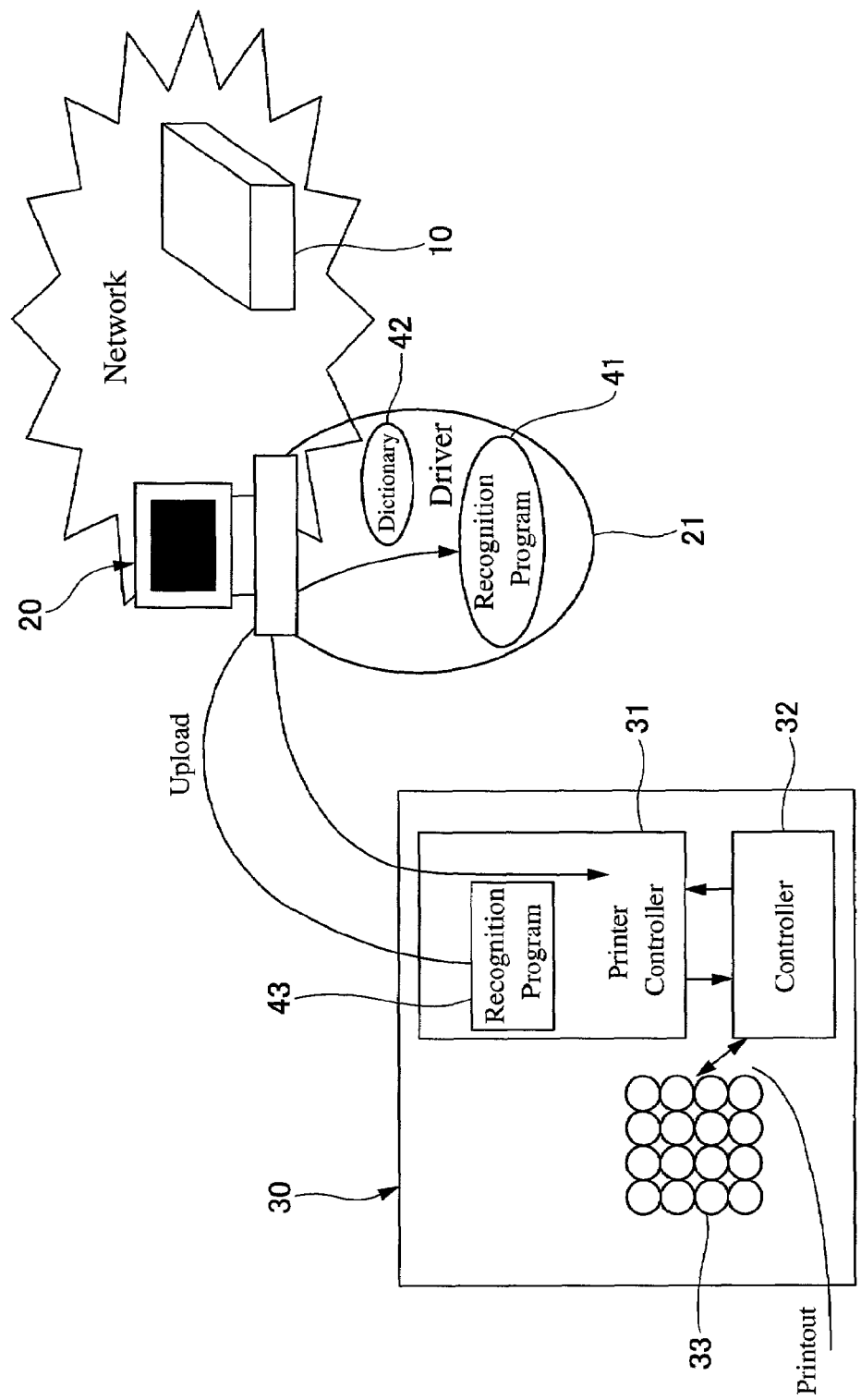
FIG. 14 is a drawing showing the overall structure of an image processing system showing another embodiment (dictionary separation) of the present invention.

FIG. 14 shows another embodiment of the present invention. As is well known, in order to carry out an image recognition process for detecting specific images, a recognition program (recognition engine) for executing such process and a dictionary are required. In this regard, such recognition program (with no dictionary portion) 43 is stored in the printer 30, and a dictionary 42 is included in the printer driver 21 of the personal computer 20.

Further, the recognition program 43 is uploaded in the personal computer 20 at a prescribed timing, and while making reference to the dictionary 42 included in the printer driver 21, the recognition program 41 loaded in the personal computer 20 carries out a recognition process on the processing object image.

Namely, there are many instances where the printer driver 21 is renewed over a cycle shorter than the life of the product in order to improve performance such as improving image quality, improving speed and the like. In this regard, the present embodiment makes it possible to also renew the dictionary data together with the renewal of the printer driver 21. In this way, it is possible to maintain the dictionary 42 in an up-to-date state, and it is possible to plan for the maintenance and improvement of recognition performance. Further, the recognition program used in the present embodiment may of course be the same as that used in the embodiments described above, and it is possible to use various programs such as those of the embodiments described below. In other words, in the recognition program in the embodiments described above, dictionary data may be stored together, or may be provided separately.

Figure 15:
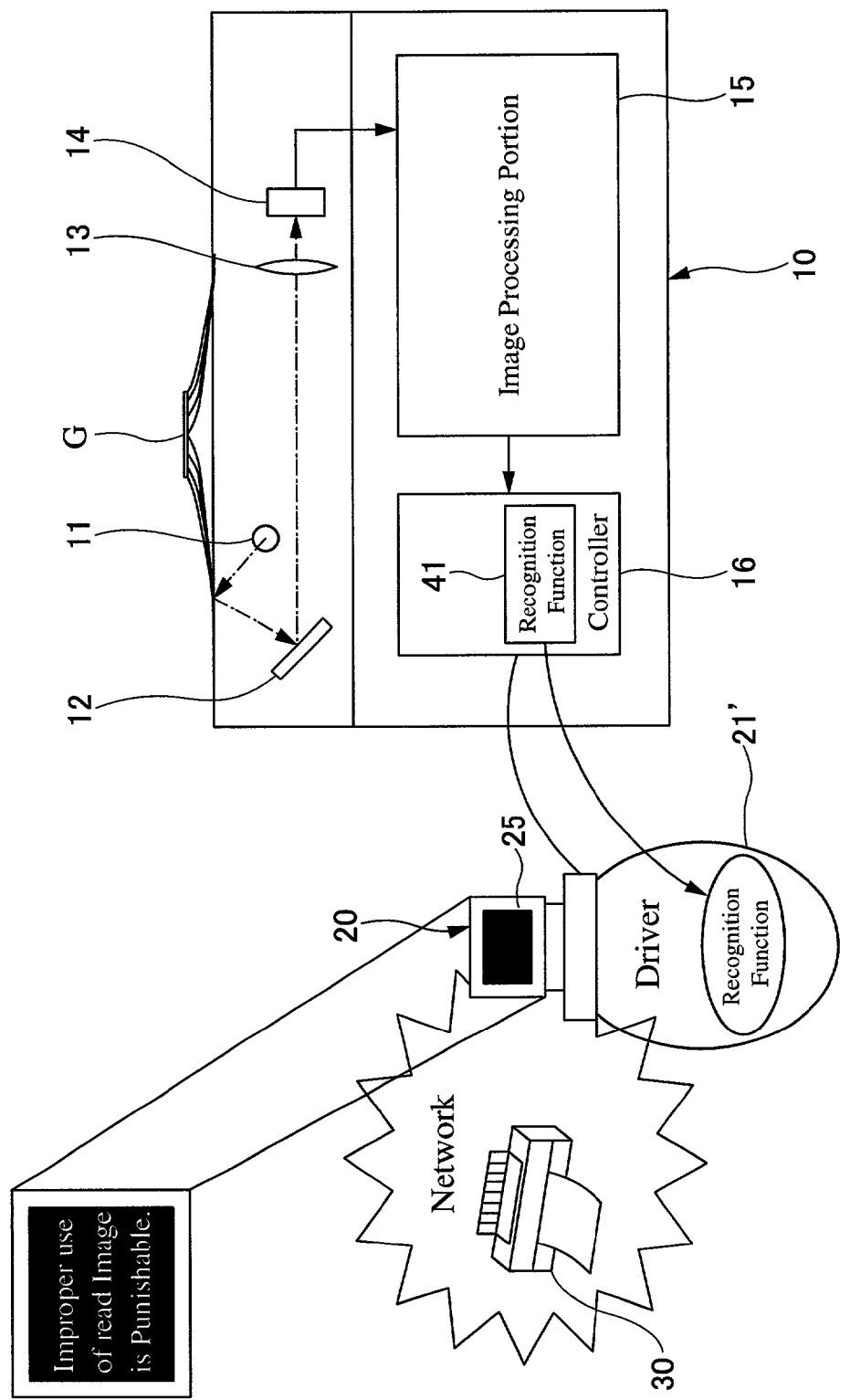
FIG. 15 is a drawing showing the overall structure of an image processing system showing another embodiment (for the scanner) of the present invention.

FIG. 15 shows another embodiment of the present invention. In all of the embodiments described above, the recognition program was provided in the printer 30, but in the present embodiment the recognition program is provided in a scanner 10.

Namely, in the scanner 10, light emitted from a light source 11 shines onto a document G, and the light path of the reflected light reflected therefrom is changed by a mirror 12, focused by a lens 13 and received by a CCD 14, and electrical signals corresponding to the intensity of the received light are sent to an image processing portion 15. The CCD 14 may use a two-dimensional CCD, or may use a CIS (contact sensor).

Further, in the image processing portion 15, after carrying out an A/D conversion or the like on the received electrical signals (voltages), data is sent to a scanner controller 16. Then, the read image data is transferred from this scanner controller 16 to the personal computer 20 via a scanner driver 21' of the personal computer 20. Because such structure of the scanner 10 is a general well-known structure from the prior art, a detailed description thereof will be omitted.

Now, in the present invention, the recognition program (recognition function) 41 is provided in the scanner controller 16, and when an image is read, the recognition program 41 is transferred to the personal computer 20 (scanner driver 21'), and then the personal computer 20 executes a recognition process that uses the recognition program 41.

Further, as for the timing of the transfer of the recognition program, it is possible, for example, to carry out transfer at the time the communication of the reading execution from the personal computer 20 to the scanner 10 is started. Of course, transfer may be carried out at the time the personal computer 20 and the scanner 10 are electrically connected.

Figure 16:
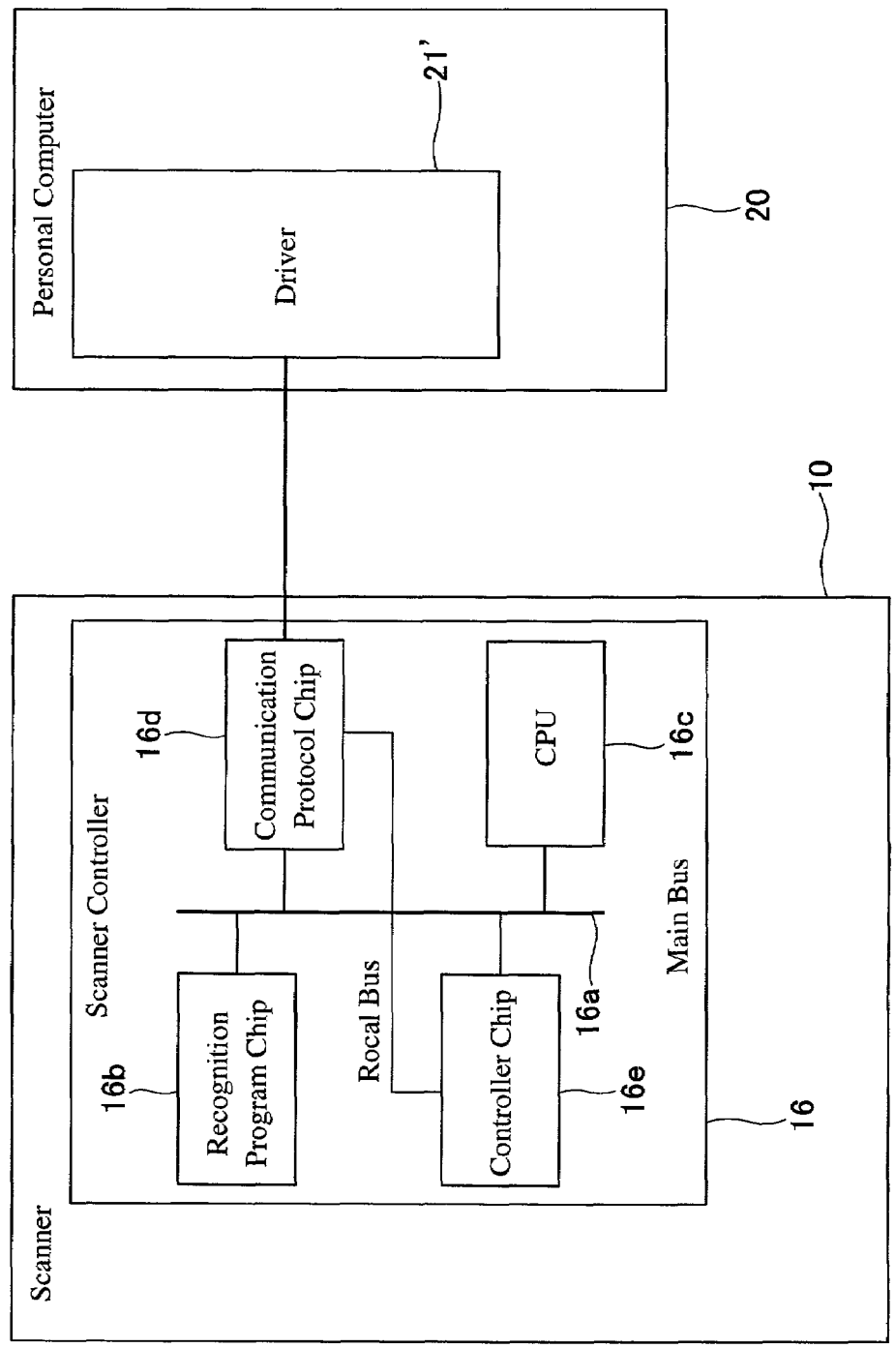
FIG. 16 is a drawing of an internal structure showing an essential portion.

Further, it is possible, for example, to use the structure shown in FIG. 16 as the internal structure of the scanner controller 16 for carrying out such process. Namely, a recognition program chip 16b is connected to a main bus 16a, and is capable of communicating with a CPU 16c and a communication protocol chip (e.g., a SCSI protocol controller) 16d. Furthermore, a controller chip 16e is connected to the main bus 16a, and exhibits the function (image reading) of a primary scanner.

Furthermore, the recognition program chip 16b is constructed, for example, by a ROM or the like, and an executable program is stored therein. In this regard, in the present embodiment, even though the recognition program chip 16b is constructed using a separate ROM, it is of course also possible to carry out storage in another region of the ROM inside the scanner controller 16.

Further, the communication of data between the scanner 10 (scanner controller 16) and the personal computer 20 (scanner driver 21') may be achieved in basically the same manner as the communication of data between the printer 30 (printer controller 31) and the computer 20 (printer driver 21) described in the embodiments above.

Figure 17:
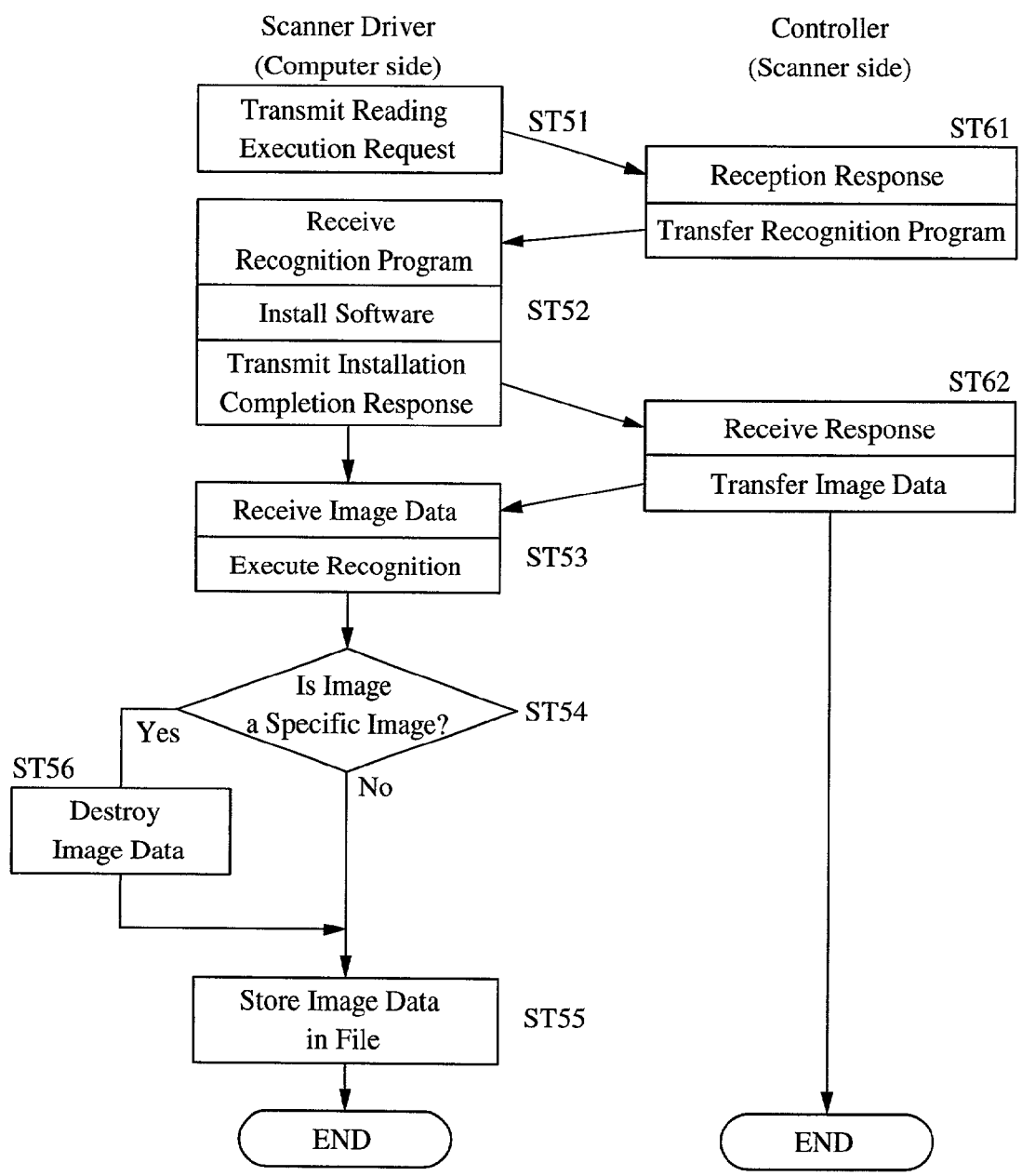
FIG. 17 is a flow chart for describing the function of the scanner driver (personal computer) and a scanner controller (scanner).

To illustrate an example, as in FIG. 17, in the case where the image of a document placed on the scanner 10 is to be read, first, the scanner driver 21' of the personal computer 20 transmits a reading execution request to the scanner 10 (ST51).

Upon receiving this request, the scanner controller 16 of the scanner 10 carries out a reception response and transfers the recognition program stored in the recognition program chip 16b to the scanner driver 21' via the communication protocol chip 16d (ST61).

In the scanner driver 21', when the transferred-in recognition program is received, an installation is immediately carried out, and after the completion of such process, an installation completion response is sent back to the scanner controller 16 (ST52). Then, after receiving this installation completion response, the scanner 10 transfers the read image data to the personal computer 20 (ST62).

In the scanner driver 21', when the transferred-in image data is received, a judgment of whether or not the received image data is a specific image is carried out (ST53, ST54). In the case where the judgment result indicates the image is not a specific image, the received image data is stored as is in a prescribed file (storage area) (ST55).

On the other hand, in the case where the image is judged to be a specific image at the branching judgment at Step 54, a prescribed prohibited reading process is carried out. In this example, the image data is destroyed (ST56). Of course, even in an arrangement of this type in which the recognition program is provided in the scanner 10, where the recognition program is transferred to the personal computer 20 as needed, with the high-performance CPU of the personal computer carrying out recognition of the read image data, it is possible to achieve the same various embodiments as those described above where the recognition program is provided in the printer.

Further, because the fact that the destruction of image data in this way may proceed too far is also taken into consideration, it is also possible, for example, to record image data having a lowered image resolution, or image data which is processed by combining a message or the like. Further, in the case where image data is recorded, because there is a risk that the feature portion for extracting specific images will disappear as the image process is carried out, the features of the specific images may be highlighted and combined, or an electronic passage may be added or the like. In this way, by carrying out the image recognition process again at the final output time, a specific pattern can be reliably detected, and this makes it possible to prevent normal printing. Furthermore, after executing the recognition process, it is also possible to uninstall the recognition program.

Moreover, when image data is not stored as described above, or when an image processed by lowering the image resolution or the like is stored, there is the risk that a normal user will judge the device to be malfunctioning. In this regard, as shown in FIG. 15, for example, a warning message may be outputted and displayed on the monitor 25.

Furthermore, even though a scanner example was shown as an image input device, the present invention is not limited to this, and a digital camera or the like may be used, for example.

Figure 18:
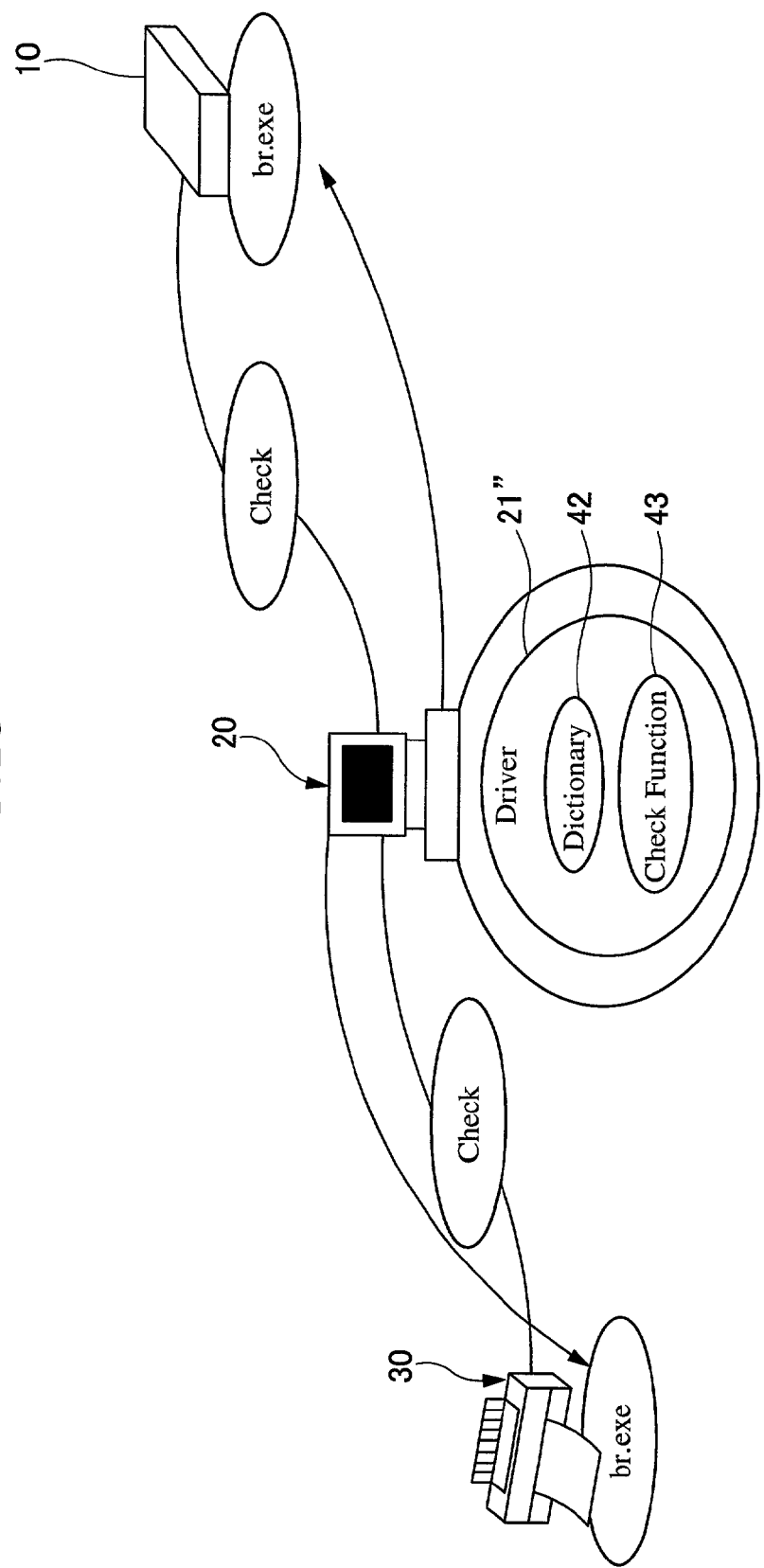
FIG. 18 is a drawing showing the overall structure of an image processing system showing another embodiment (provided with a check function) of the present invention.

FIG. 18 shows another embodiment of the present invention. In the present embodiment, a check function 43 for checking the presence or absence of a recognition program is provided in a driver 21" of the personal computer 20. This check function 43 is stored in each driver (scanner driver, printer driver, etc.), and is a function which judges whether or not a recognition program execution module is provided in peripheral devices connected to the personal computer 20, namely, in an image input device such as the scanner 10 or the like, and an image output device such as the printer 30 or the like.

Figure 19:
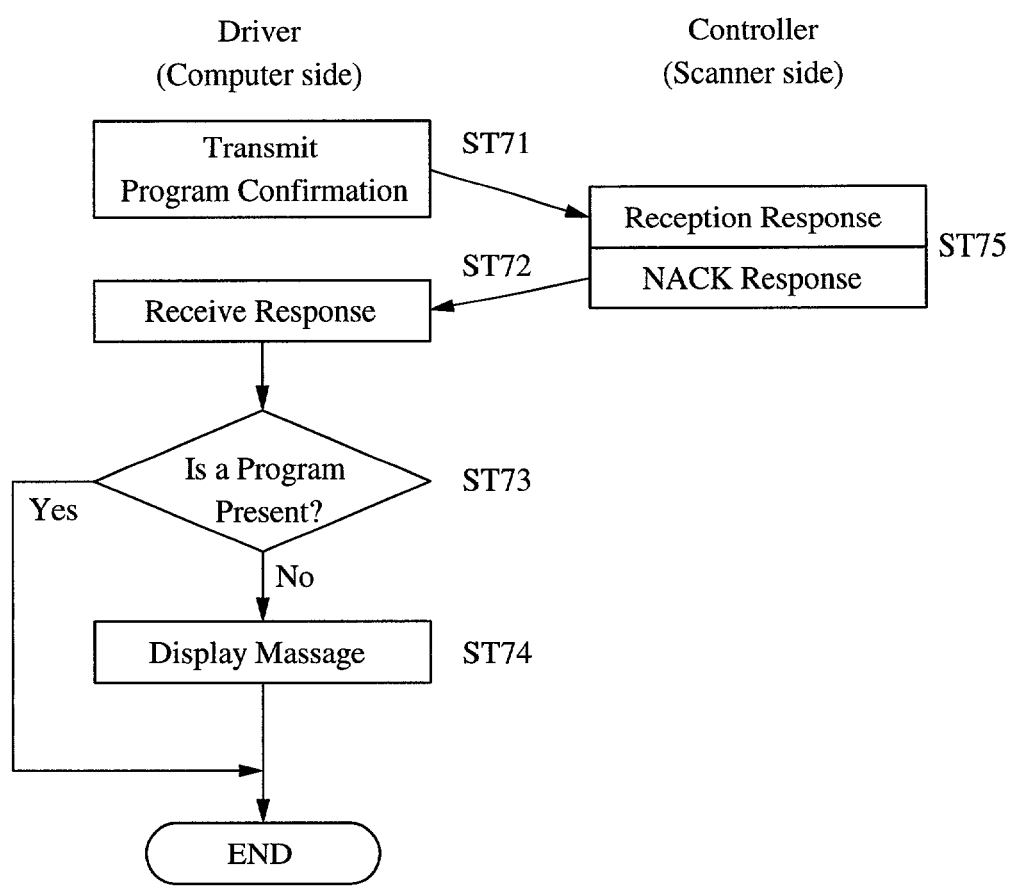
FIG. 19 is a flow chart for describing the function of a driver (personal computer) and a controller (peripheral device) in the embodiment shown in FIG. 18.

Further, this check function 43 executes a program like that shown in FIG. 19. Namely, first, a program confirmation request is transmitted to peripheral devices such as the printer 30 and the scanner 10 connected to the personal computer 20 (ST71), and then a standby is carried out.

Because the controllers of the peripheral devices that receive this program confirmation request send back a response on whether or not a recognition program is provided in themselves (ST75), the driver 21" of the personal computer 20 receives such responses from the peripheral devices, and as a result, carries out a judgment of whether or not an execution module (recognition program) for carrying out recognition of specific images is provided (ST72, ST73). Then, in the case where the recognition program is not provided, a prescribed warning message is outputted and displayed on the monitor 25 of the personal computer 20 (ST74). For example, a message such as "The printing of banknotes and the like are prohibited." or the like which arouses attention may be used as the warning message.

When such display is carried out, the expected result is that it will be possible to prevent a user having good intentions from reading banknotes and the like and carrying out an act such as printout or the like due to ignorance of the law.

Further, in the case where a recognition program is not provided, the recognition program is loaded in the personal computer 20 at a prescribed timing, and a recognition process is carried out in the same manner as was described for the embodiments above.

Furthermore, in the embodiment described above, a response from the peripheral devices concerning the presence or absence of a recognition program forms a precondition, and in the case where, for example, a response is not received within a prescribed time interval, the judgment that such recognition program is not provided may be carried out.

Further, the timing for issuing this program confirmation request may be carried out at prescribed time intervals, or when image reading or image output or the like is to be carried out, this timing may be carried out first. Furthermore, in the example shown in the drawing, an example where the "dictionary 42" is stored in the driver 21" of the personal computer 20 is shown, but the dictionary itself may also be uploaded from a peripheral device together with the recognition program in the same manner as in the other embodiments.

Figure 20:
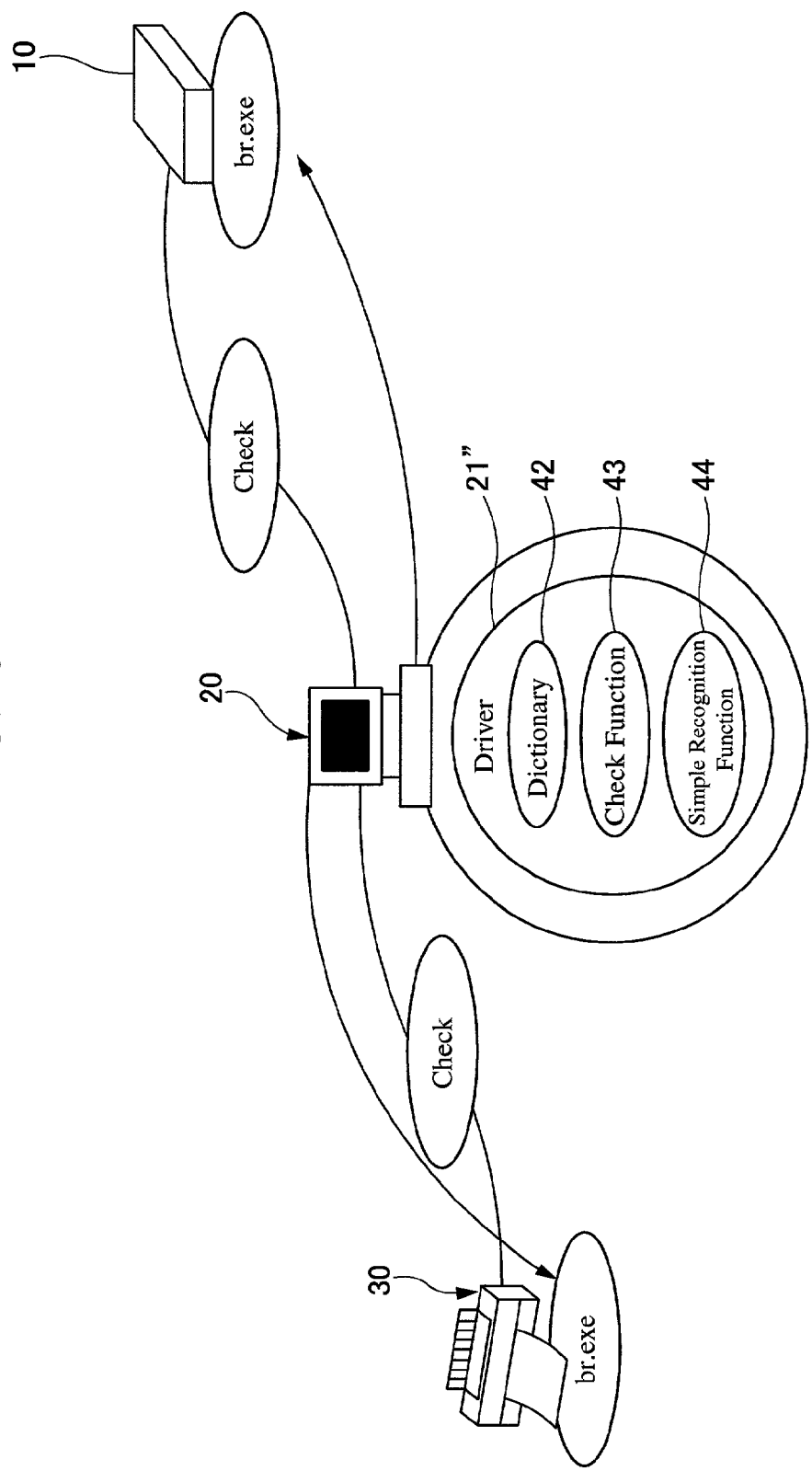
FIG. 20 is a drawing showing the overall structure of an image processing system showing another embodiment (provided with a simple recognition program) of the present invention.

FIG. 20 shows another embodiment of the present invention. This embodiment is an example arrangement in which the embodiment shown in FIG. 19 is used as a base with an added function. Namely, in the embodiment shown in FIG. 19, in the case where a recognition program is not stored in the peripheral devices, only a message is displayed, but in the present embodiment, a simple recognition program 44 is also provided in the driver 21", and in the case where a recognition program is not in the peripheral devices, the simple recognition program 44 provided in the driver 21" is executed, and a recognition process is carried out on the read image or output image.

In this way, it is possible to more effectively prevent an improper act than the case where only a message is displayed. Namely, for people who intentionally carry out improper use, even when a message is outputted, there is the risk that no attention to the message will be made and counterfeiting or the like will be carried out. In such case, by using the simple recognition program, it is possible to prevent a certain degree of improper acts.

Figure 21:
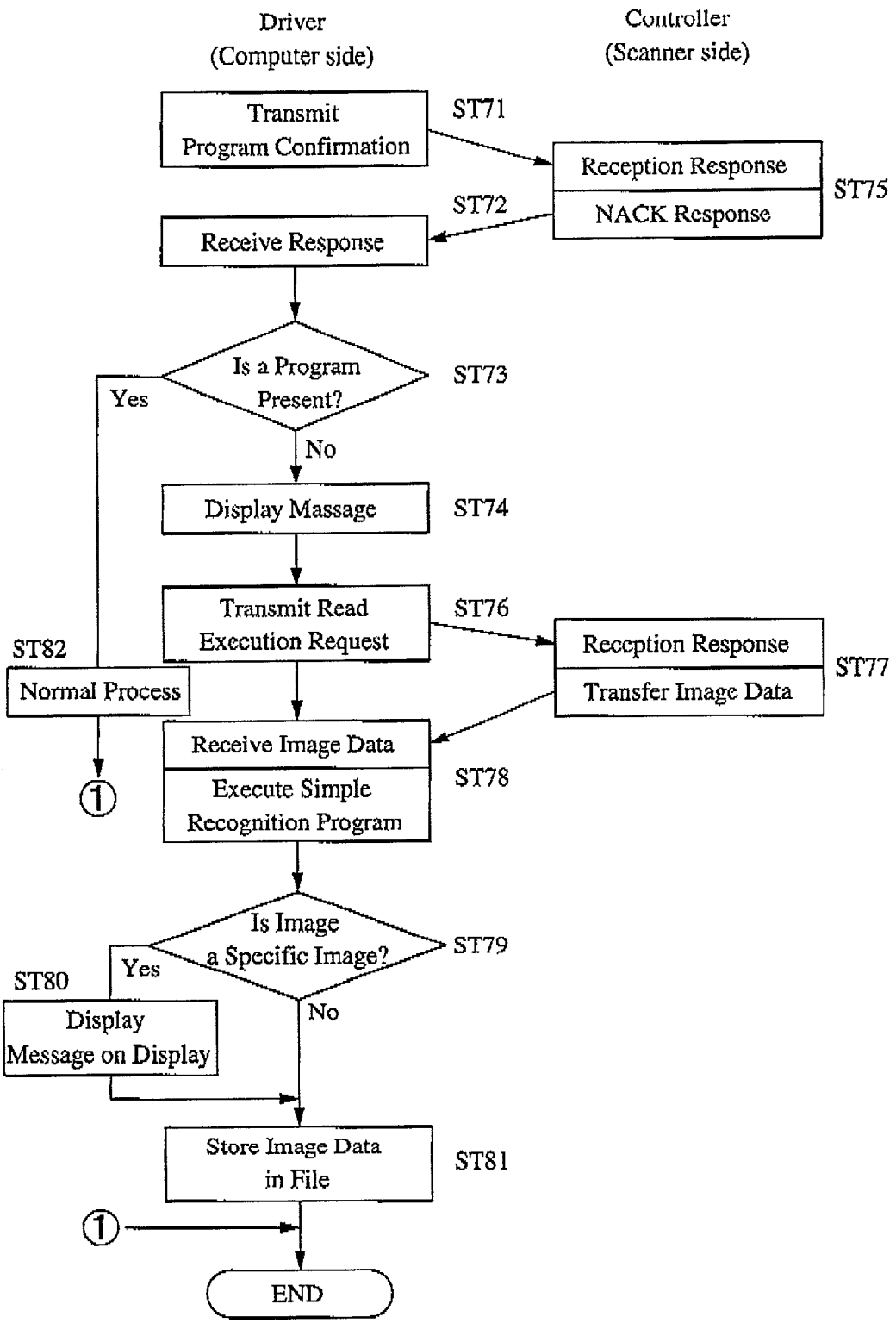
FIG. 21 is a flow chart for describing the function of a driver (personal computer) and a controller (scanner) in the embodiment shown in FIG. 20.

Further, the actual process function executes the flow chart shown in FIG. 21, for example. This example is an example where the peripheral device is a scanner. Namely, the driver of the personal computer 20 transmits a program confirmation request (ST71), receives a response from each peripheral device (ST75), judges whether or not a recognition program is provided based on the response (ST72, ST73), and outputs and displays a message in the case where the program is absent (ST74). Such points are the same as those in the embodiment described above.

Now, in the present embodiment, after outputting such message, a recognition execution is carried out by a simple recognition program 44. Preceding this, in the case where the driver is a scanner driver, because the image data that should be recognized needs to be received from the scanner controller, a read execution request is transmitted (ST76). On the other hand, because the scanner controller that receives this read execution request transfers image data (ST77), this transferred-in image data is received, and the simple recognition program is executed to carry out a recognition process on this received image data (ST78).

Further, in the case where the result of the recognition process by such simple recognition program indicates that a specific image was detected, after outputting a prescribed warning message (ST80), the read image data is preserved as is (ST81). Of course, in the case where a specific image is not detected, the image data is stored as is in a file (ST81).

The warning message carried out at Step 80 described above may be a relatively light message such as "This is a prohibited printing image" or the like, or may be taken one step further with "Because the appearance of a banknote or valuable security has been judged, prescribed information has been added in the image. This will be employed as evidence in the case of use." or the like. In particular, in the latter case, a sufficient prevention result will be obtained regardless of whether or not prescribed information, tracking information or like is actually added.

Further, if prescribed information or the like is not actually added when the message is displayed as described above, demerit given to the user at the time of misrecognition can be reduced while realizing the prevention result described above. In particular, this is a useful function because the simple recognition program has a high probability of misrecognition relative to the regular recognition program.

Further, in the case where a Yes occurs at the branching judgment of Step 73, the recognition program stored in the scanner controller 16 of the scanner 10 is uploaded at a prescribed timing, and this recognition program is executed to carry out a normal process of carrying out a recognition process (ST82).

Figure 22:
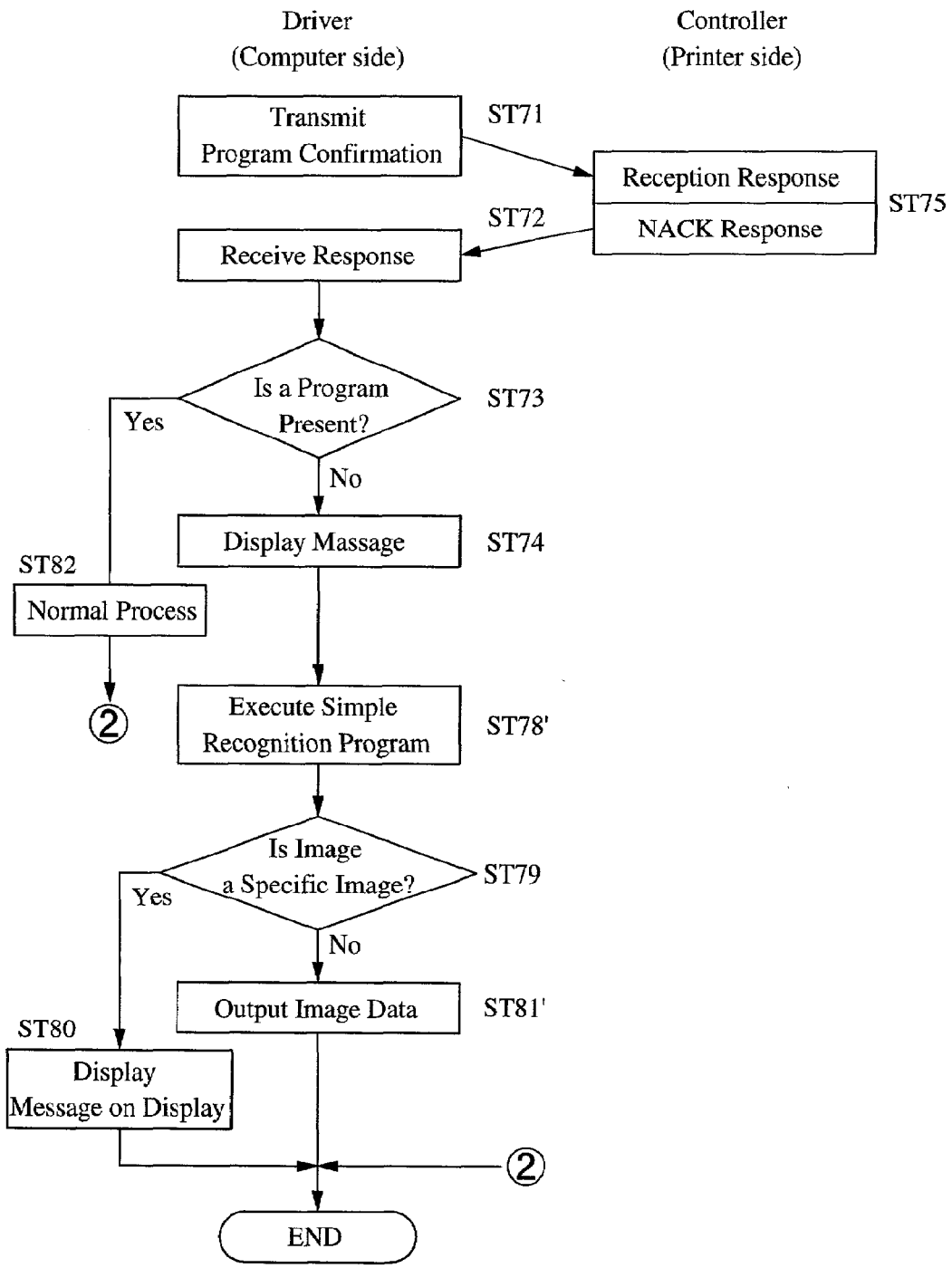
FIG. 22 is a flow chart for describing the function of a driver (personal computer) and a controller (printer) in the embodiment shown in FIG. 20.

On the other hand, in the case where the peripheral device is a printer, the flow chart shown in FIG. 22 is executed, for example. As is clear by comparing FIG. 21 and FIG. 22, basically, because the same process is executed, the same step numbers are assigned to the corresponding process steps.

In this regard, in the case where image output is carried out, because the image data that should be outputted is already held in the personal computer, the execution request carried out at Step 76 and the like which was required in the case of a scanner is eliminated, and after displaying the message at Step 74, the personal computer executes the simple recognition program to carry out a recognition process on the image data waiting to be printed (ST78').

Then, in the case where a specific image is detected, a warning message is displayed (ST80), and the process is terminated without carrying out an image output, but in the case where a specific image is not detected, image data is outputted in a normal manner (ST81'). Further, in the case where a specific image is detected, it is possible to output image data which has undergone a prescribed processing or the like, such as by lowering image resolution, applying colors, combining messages or the like.

FIG. 23 shows another embodiment of the present invention. In the present embodiment, the scanner 10 and the printer 30 are indirectly connected to the computer 20 via a control device such as a relay device 40 or the like to form a structure that is essentially equivalent to a closed state, and this structure is applied to the case where the series of processes from reading the image to outputting the image are carried out within a closed space, as in a copy mode where the document read by the scanner 10 is outputted by the printer.

Further, in the case where a recognition program is stored in each of the controllers of both the scanner 10 and the printer 30, it is possible to improve recognition accuracy by respectively executing both of such recognition programs. Namely, first, at the time of image reading, a recognition process is carried out using the recognition program stored in the scanner 10 while data is communicated between the scanner 10 and the personal computer 20. In this way, some sort of information is added in the case where a specific image is present.

Next, when this read image data is sent to the printer 30 to undergo image output (printout), the recognition program stored in the printer 30 is uploaded in the personal computer 20, and then a recognition process is carried out using the recognition program stored in the scanner 10 while data is communicated between the scanner 10 and the personal computer 20. In this way, the recognition accuracy is improved by carrying out both checks.

Figure 24:
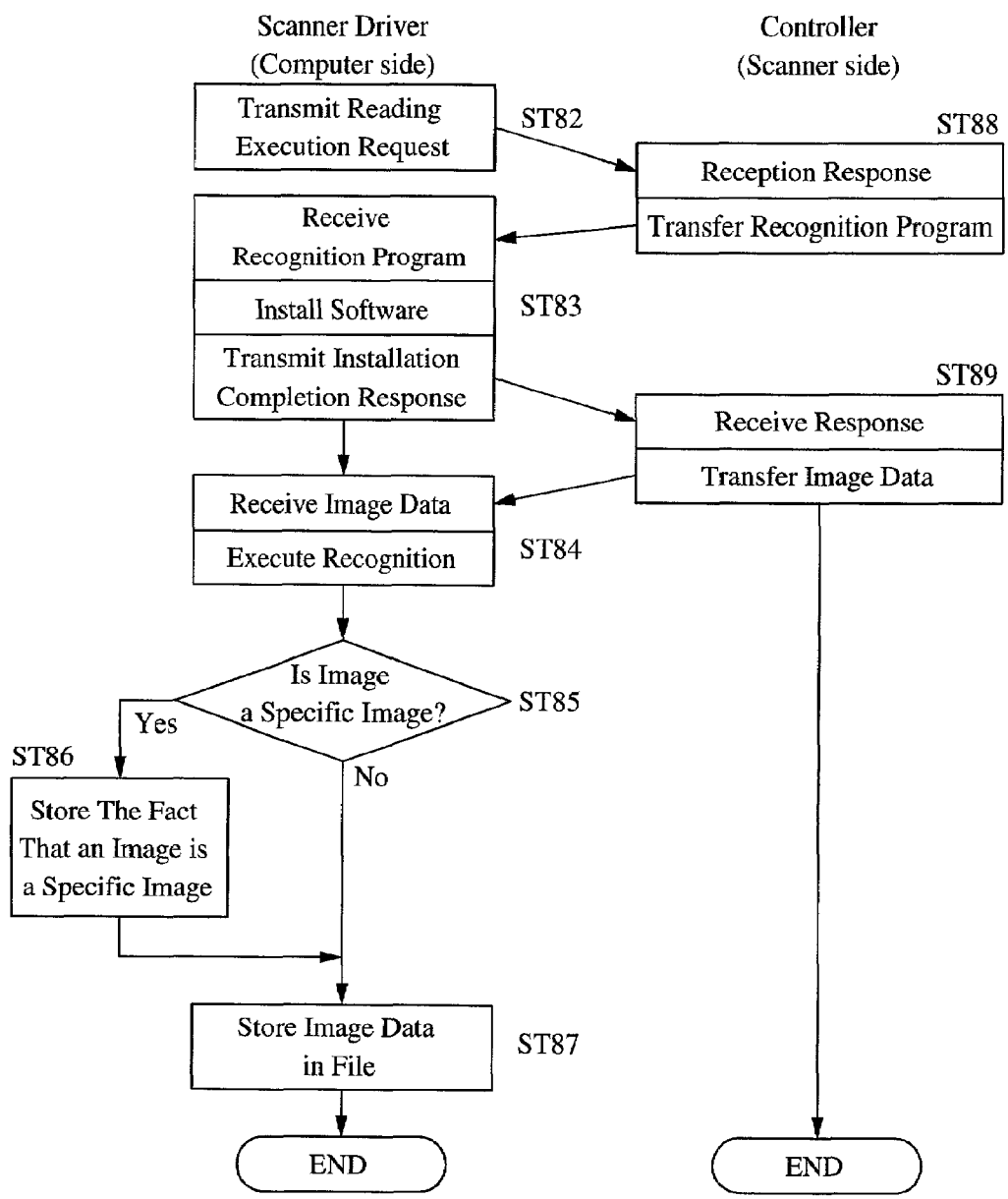
FIG. 24 is a flow chart for describing the function of a driver (personal computer) and a controller (scanner) in the embodiment shown in FIG. 23.
Figure 25:
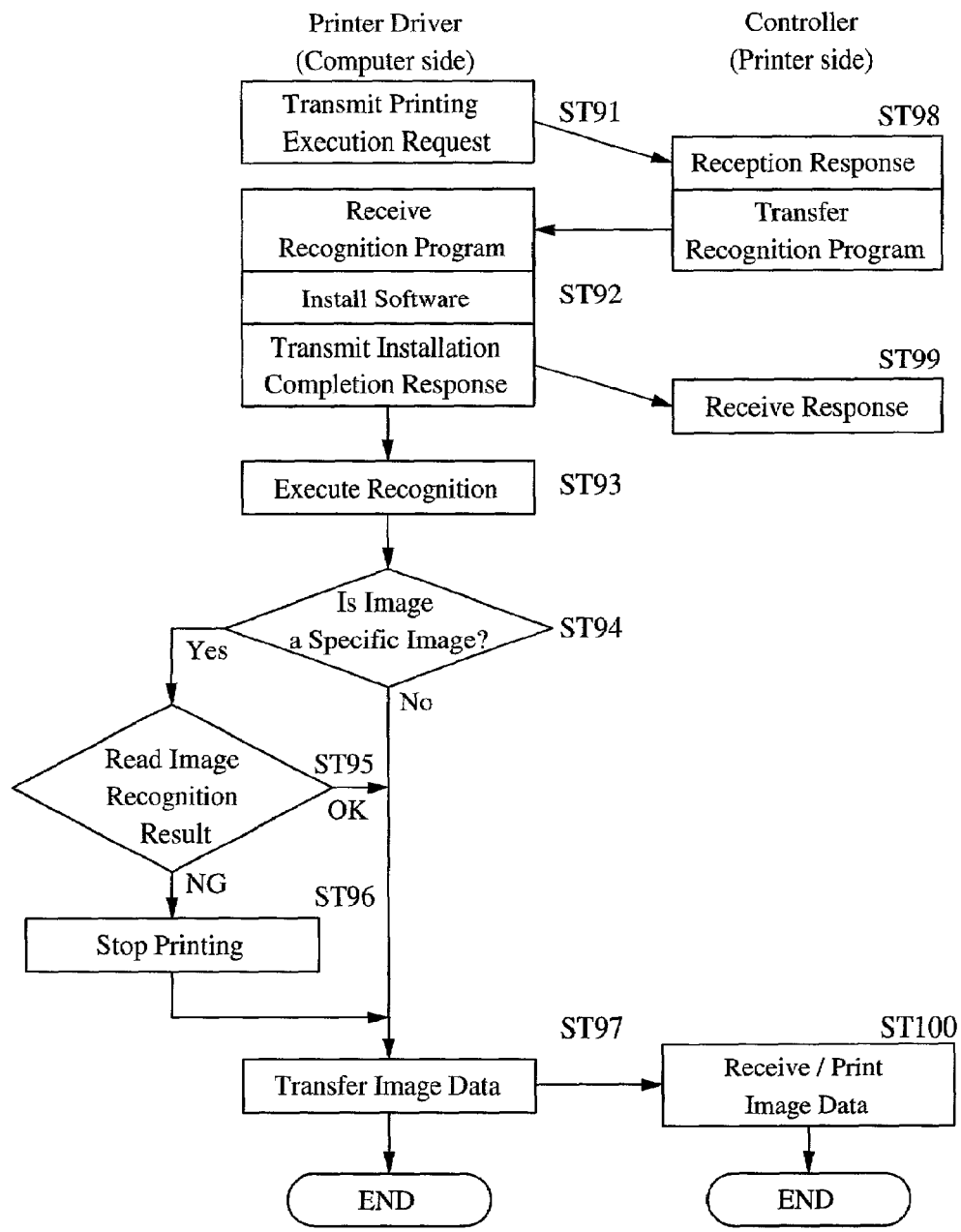
FIG. 25 is a flow chart for describing the function of a driver (personal computer) and a controller (printer) in the embodiment shown in FIG. 23.

Now, in actuality, the flow charts shown in FIG. 24 and FIG. 25 are executed. Namely, in the case of the copy mode, because the document first needs to be read by the scanner 10, first, a read execution request is transmitted to the scanner 10 from the personal computer 20 (ST82).

Because the scanner controller that receives this request will carry out a reception response thereto and transfer (upload) the recognition program (ST88), after receiving the transferred-in recognition program, the scanner driver of the personal computer 20 will carry out an installation, and when the installation is completed, a completion response thereto is transmitted to the scanner controller (ST83).

When the scanner controller receives this installation completion response, because the document will be read in response thereto and the read image data will be transferred (ST89), the scanner driver receives such transferred image data, and then the previously installed recognition program is executed to carry out a recognition process on this image data (ST84). Further, the actual reading by the scanner may be carried out after the installation completion response is received as described above, or a reading process may be carried out (in which data transfer to the personal computer is not carried out) before that at the time a reading execution request is received, and then after an installation completion notice is received, the read image data may be transferred.

On the other hand, in the case where the judgment (ST85) of whether a specific image is present or absent based on the recognition execution result indicates the absence of a specific image, the received image data is stored as is in a file (ST87). Further, in the case where a specific image is detected, the fact that the image is a specific image is stored in connection with the image data stored in the file (ST86). Namely, regardless of whether a specific image is present or absent, the read image data is stored as is. Further, in the case where a specific image is detected, such fact is stored in connection with the image data. By the process described above, the reading steps are terminated.

Next, with reading having been carried out as described above, the image data transferred in to the personal computer 20 is further transferred from the personal computer 20 to the printer 30, and then by carrying out printing, the execution of the copy mode is completed. In this regard, when the image data is transferred from the personal computer 20 to the printer 30, the process shown in FIG. 25 is executed.

Namely, first, the printer driver of the personal computer 20 transmits a printing execution request to the printer controller (ST91). Because the printer controller that receives this request will carry out a reception response thereto and transfer (upload) the recognition program (ST98), after receiving the transferred-in recognition program, the printer driver of the personal computer will carry out an installation, and when the installation is completed, a completion response thereto is issued to the scanner controller (ST92). Upon receiving this completion notice, the printer controller waits for the next image data to be sent in.

Further, the printer driver uses the installed recognition program to execute recognition on the image data that was transferred from the scanner and stored in a file, and carries out a judgment of whether or not there was a specific image (ST93, ST94). Now, in the case where there is no specific image, the image data stored as is in a file is transferred to the printer (ST97). On the other hand, in the case where a specific image is detected, the recognition result carried out when the read images were transferred between the scanner and the personal computer is confirmed (ST95). Now, in the case where the presence of a specific image is recognized by the recognition result of the read image, a printing stop process is carried out (ST96). Further, in the case where the presence of a specific image is not recognized at the time of reading, the process proceeds from the branching judgment Step 95 to Step 97, and image data is transferred. Then, the printer controller receives the transferred-in image data, and carries out printing (ST100).

As described above, in the present embodiment, an image recognition process is carried out both at the time of image reading between the scanner and the personal computer, and at the time of printing between the personal computer and the printer, and in the case where both of these detect a specific image, for the first time printing is not carried out (AND process), but in the case where only one of these detects a specific image, a misdetection is judged to exist and a normal output is carried out.

However, the opposite of this may be carried out in which a normal output is not carried out in the case where a specific image is detected by either one (OR process). Further, in the present embodiment, an output is not carried out in the case where a specific image is finally judged to be present, but it is also of course possible to combine a message or the like with the image data, paint over one portion, or carry out printing that has undergone a prescribed processing such as lowered image resolution or the like in the same manner as in the embodiments described above.

Figure 26:
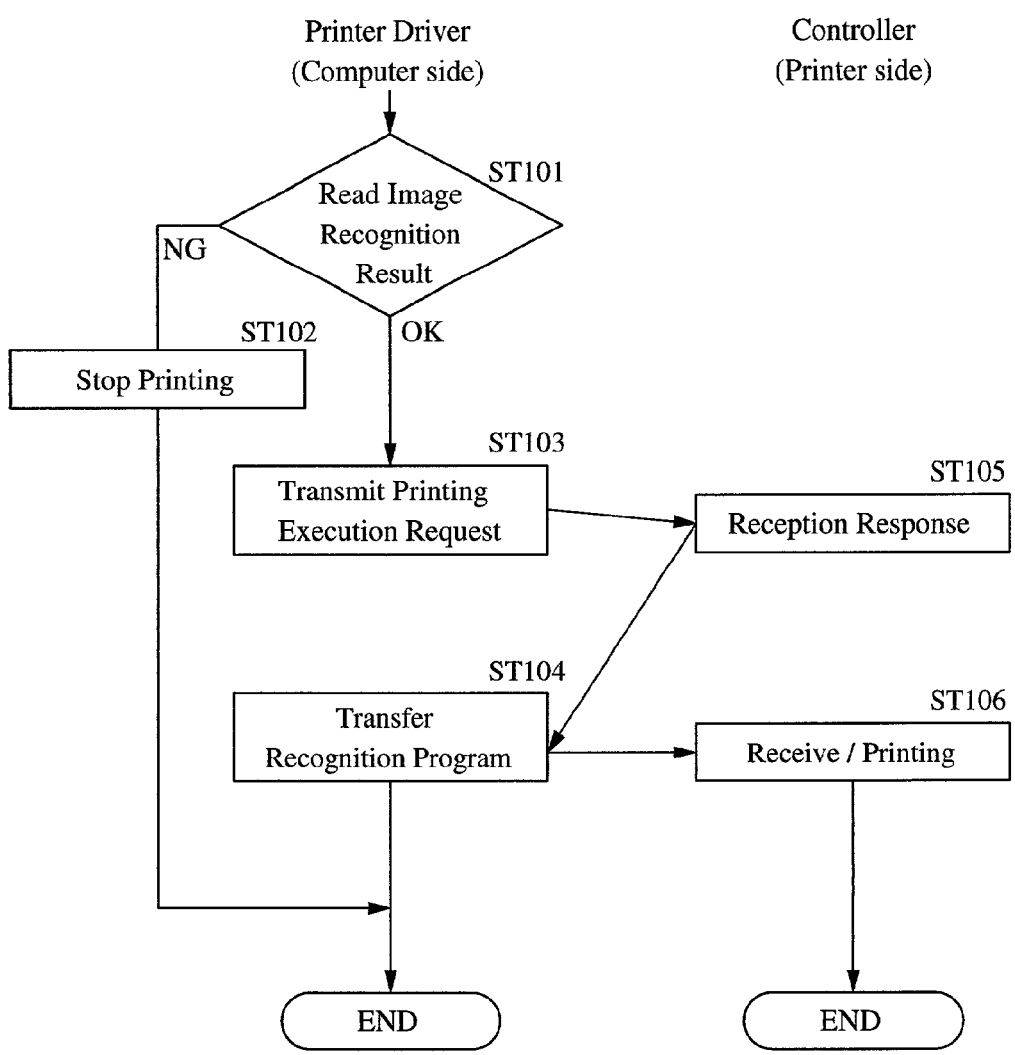
FIG. 26 is a flow chart for describing another function of a driver (personal computer) and a controller (printer) in the embodiment shown in FIG. 23.

Further, the process carried out between the personal computer 20 and the printer 30 may be the process shown in FIG. 26 in place of the process shown in FIG. 25. Namely, recognition is executed using the recognition program of the scanner, and by judging the recognition result at the print time, it is possible to prevent improper printing. Specifically, before printing is carried out, the recognition result carried out at the time read images were transferred between the scanner and the personal computer are confirmed for the image data that will be printed (ST101).

Then, in the case where the recognition result of the read image is recognized as indicating that a specific image is present (NG), a printing stop process is carried out (ST102). Further, in the case where the presence of a specific image at the read time is not recognized (OK), the process proceeds to Step 103, and a printing execution request is transmitted to the printer controller (ST103).

Then, because there is a reception response from the printer (ST105), the printer driver of the personal computer waits for this response and transfers image data (ST104). Then, the printer controller receives the transferred-in image data, and carries out printing (ST106).

In the example described above the recognition process was carried out at the read time, but the present invention is not limited to this, and it is of course possible to reverse the scanner and the printer, wherein the image is read as is by the scanner, and the recognition program of the printer is executed.

Further, in the other examples described above, applied examples were shown for the type where a personal computer or the like is arranged between the scanner and the printer, but the present invention is not limited to this, and even though it is omitted from the drawings, application can be carried out for the type where the scanner and printer are directly connected.

Figure 27:
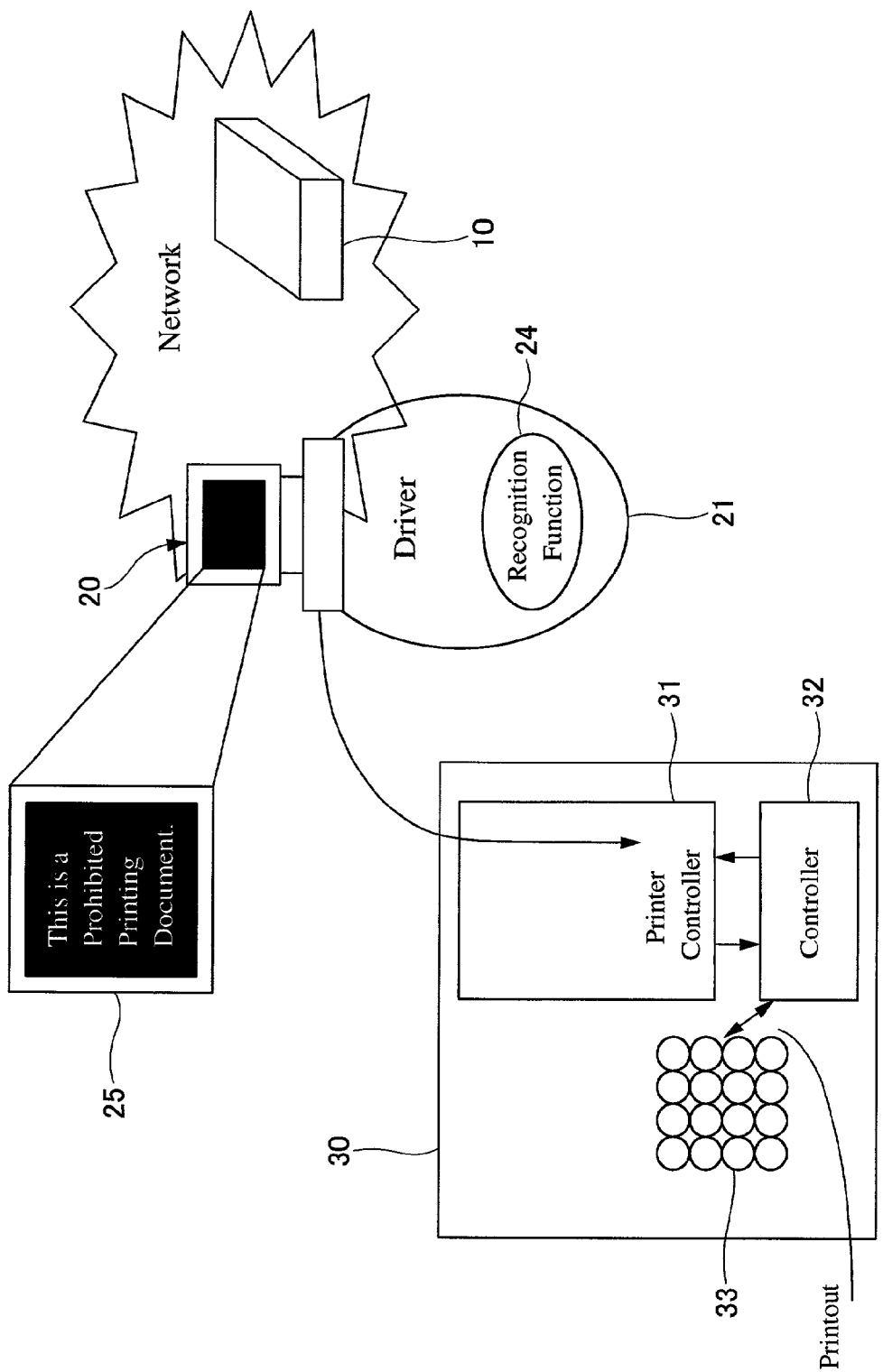
FIG. 27 is a drawing showing the overall structure of an image processing system showing another embodiment of the present invention.

FIG. 27 shows another embodiment of the present invention. As shown in the drawing, in the present embodiment, recognition software 24 is also installed in advance in the printer driver 21 of the personal computer 20. In general, a correspondence is established between the printer and the printer driver, and it is possible to install an optimized recognition function for the printer in the printer driver.

Figure 28:
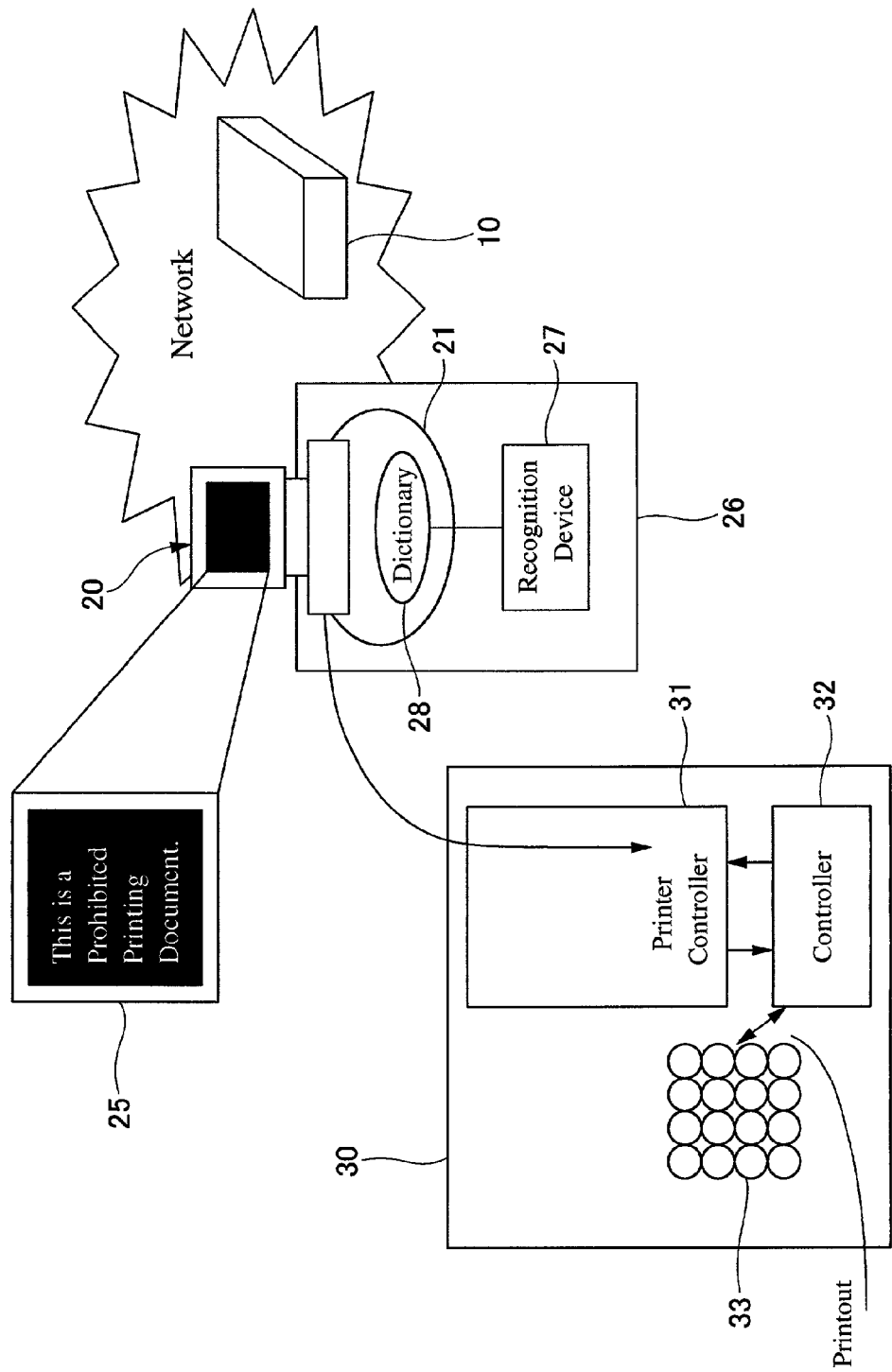
FIG. 28 is a drawing showing the overall structure of an image processing system showing another embodiment of the present invention.

Further, as for the condition in which the recognition program is provided in advance in the personal computer 20, in addition to the installation carried out in the printer driver described above, it is possible to provide a recognition device 27 on the main board or expansion board 26 of the personal computer, as shown in FIG. 28 for example. In this case, a dictionary (portion for storing information and the like related to specific patterns, and data necessary for recognition) 28 used by the recognition device 27 may be provided on a board, or as previously described, the advantage of the printer driver 21 may be enhanced by provision in the driver 21.

Figure 29:
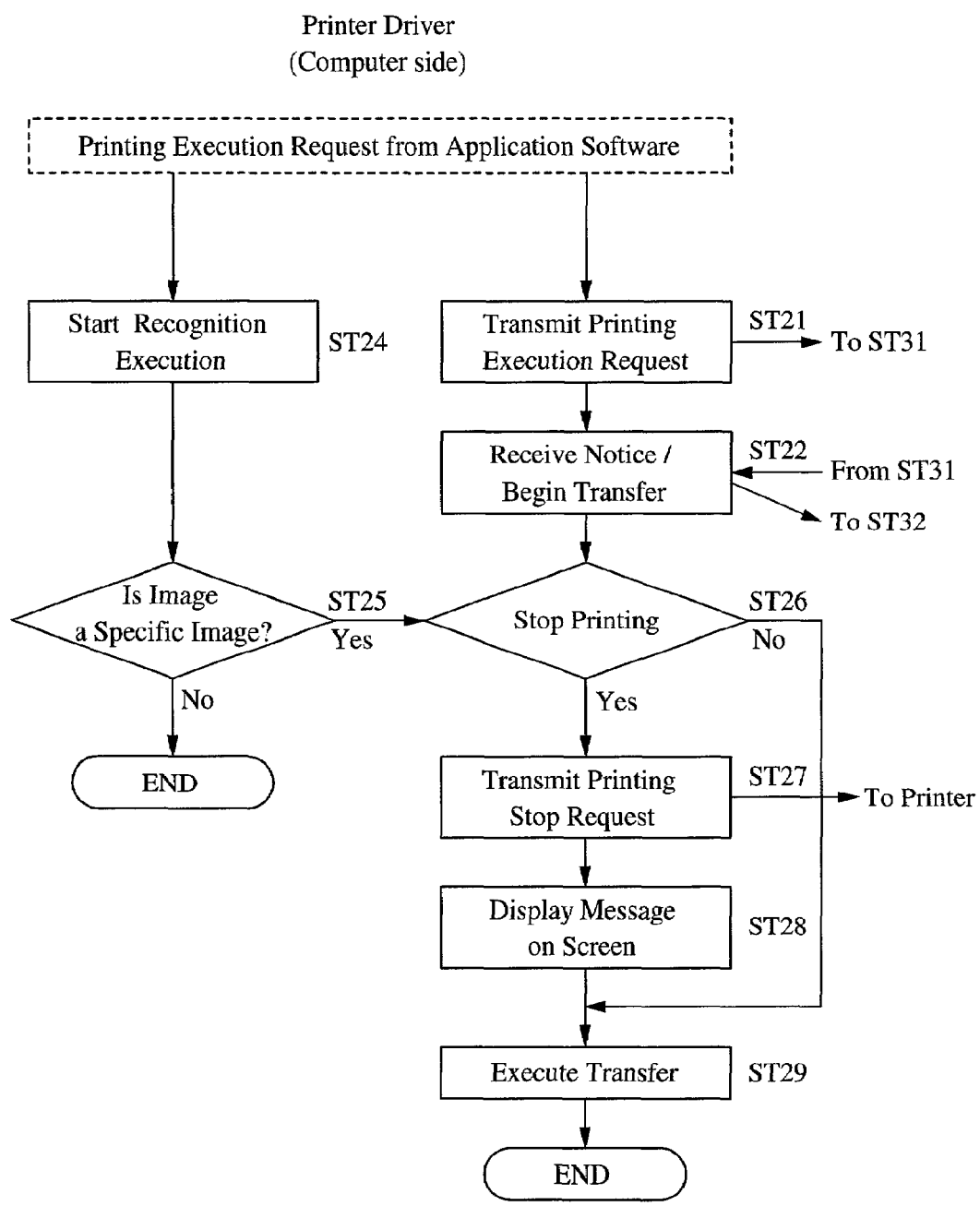
FIG. 29 is a flow chart for describing the function of a printer driver (personal computer) in the embodiments shown in FIG. 27 and FIG. 28.
Figure 30:
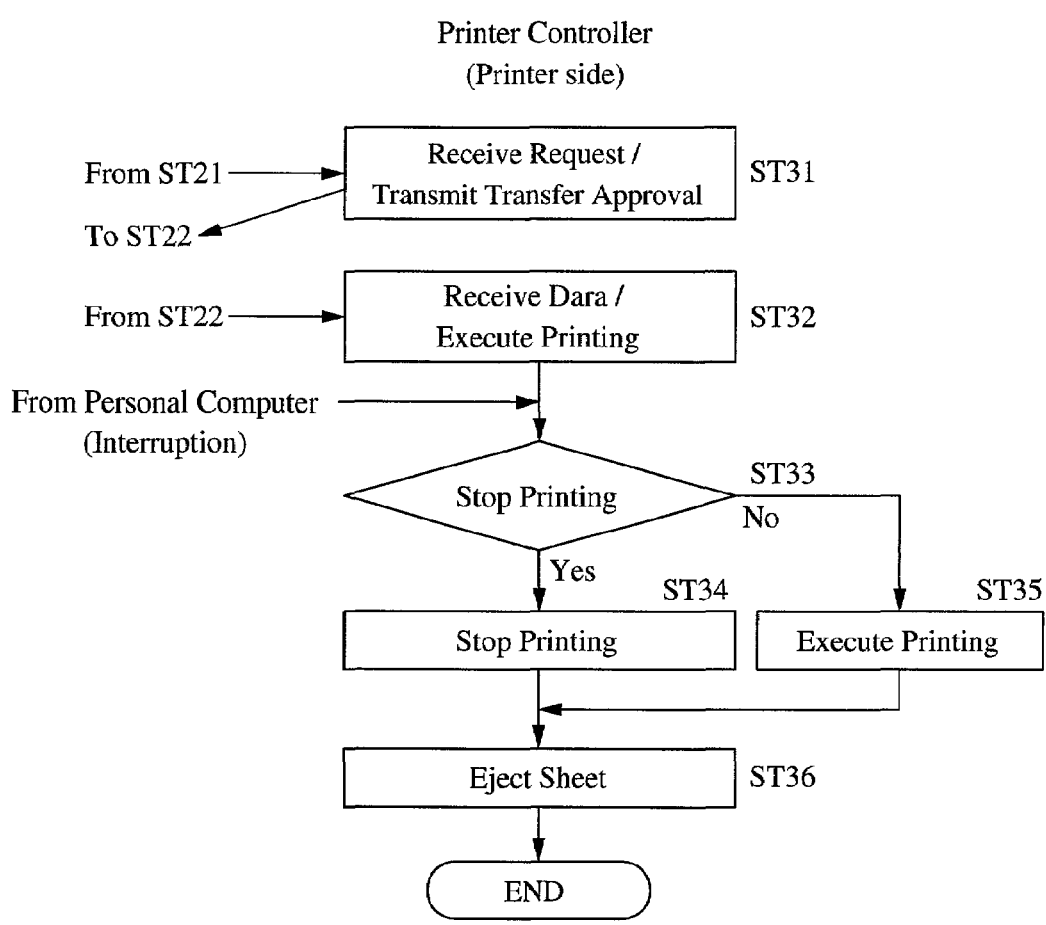
FIG. 30 is a flow chart for describing the function of a printer controller (printer) in the embodiments shown in FIG. 27 and FIG. 28.

Either way, by providing the recognition program in advance in the personal computer, there is no need for installing the recognition program each time a printing execution is carried out. Further, in these embodiments shown in FIG. 27 and FIG. 28, the respective process functions of the personal computer 20 and the printer 30 that correspond to FIG. 11 and FIG. 12 are shown in FIG. 29 and FIG. 30. As is made clear by comparing FIG. 29 with FIG. 11 and FIG. 30 with FIG. 12, in the present embodiment, because the recognition program is originally included in the personal computer, and because there is no need to upload the recognition program from the printer before the printing execution, the process step related to such uploading is eliminated, and the other functions (steps) are basically the same.

Namely, as shown in FIG. 29, in the personal computer 20, when a printing execution request arrives from an application software, the printing execution request is transmitted (ST21), and the recognition execution is started (ST24). Then, as shown in FIG. 16, when the printing execution request is received, the printer outputs a transfer approval notice to the personal computer (printer driver) (ST31). Because the process carried out by the printer after receiving this transfer approval notice will exhibit a process function in the same manner as the above-described embodiment shown in FIG. 12, a detailed description thereof is omitted.

Further, when the above-described transfer approval notice is received, the printer driver starts the transfer of image data (ST22), and the printer receives the data and executes printing (ST32). Then, in the case where the recognition result during the printing execution judges an image to be a specific image, because a printing stop command is issued via the driver (ST25→ST26→ST27), the printer receives this command and stops printing, and then ejects the sheet (ST33, ST34, ST36).

Further, because the user can not understand what is happening (there is a risk a malfunction will be judged) if only printing is stopped and the sheet is ejected partway through printing, a message is displayed on the monitor 25 of the personal computer 20 (ST28).

Now, because the other process functions are the same as those (the functions of FIG. 11, FIG. 12) of the embodiment shown in FIG. 10 described above, a detailed description thereof is omitted. Further, in this example, the recognition process and the printing execution were executed in parallel, but it is also possible to issue a printing execution request after the completion of the recognition operation based on the result thereof.

FIG. 31 shows the function of an essential portion of another embodiment of the present invention. For example, as in the embodiments shown in FIG. 9 and, FIG. 27, FIG. 28, in the case where the recognition program is provided in the personal computer before the issuance of the printing execution request, it is possible to improve the function of the personal computer 20 (printer driver 21) as shown in FIG. 31.

Namely, as shown in (a) of the same drawing, the data to be printed is recognized in advance (ST41), and the result thereof is stored. Namely, in the case where a specific image is detected, a prohibited printing flag is switched on (ST43), and in the case where a specific image is not detected, a capable printing flag is switched on (ST44).

Then, as shown in (b) of the same drawing, when a printing execution request arrives from an application software, the setting of the flags at Steps 43, 44 are confirmed, and a judgment of whether or not printing should be executed is carried out (ST45). Then, in the case where the prohibited printing flag is on, it is judged that printing should not be executed, and a message is outputted on the monitor (ST46). Further, when the capable printing flag is on and it is judged that the printing execution is possible, a normal printing process is carried out, namely, first, a printing execution request is outputted to the printer (ST47), after which the personal computer waits for a printing approval notice to be received from the printer and then transfers image data.

In the case where a printing execution request from an application software is issued for image data that is partway through recognition or not recognized, namely, in the case where neither of the prohibited printing flag and the capable printing flag is on, it is possible to carry out a process in the same manner, for example, as the flow chart shown in FIG. 29.

INDUSTRIAL APPLICATION

As described above, in the image recognition device, the peripheral device connected with the image recognition device, and the image processing system according to the present invention, when a printout is carried out via an image forming device connected to a computer, it is possible to detect prohibited output items, and prevent normal output.

In particular, in the case where a recognition program is sent from the image forming device, it is possible to execute a recognition process using a recognition program suited to each image forming device.

Further, in the case where the loaded recognition program is uninstalled after the recognition process, it is possible to construct an improper printing prevention system which has strength against hacking and a small effect on the overall price of the printer.

Further, in the case where a prohibited output image is detected, if the monitor controlled by the computer is provided with a function for outputting a message, it is possible to effectively inform a user or the like that there is a prohibited output item. Furthermore, when a structure is provided in which the recognition program is stored in an applied security state, there is strength against hacking, and the safety is increased further.

Moreover, in the image processing system of the present invention, a dictionary is provided in the computer, and preferably it should be relatively easy to update this dictionary. Further, when a function for judging whether or not a recognition program is held by a connected peripheral device is provided in the computer, it is possible to carry out a process suited to the environment of the image processing system. As an example, it is possible to display a message indicating that it is illegal to output a prohibited output item.

Furthermore, when the computer is provided with a simple recognition program, even in the case where there is no recognition program in the peripheral devices, a judgment of whether or not there is a prohibited output item can be carried out by the simple recognition program. Then, in the case where an item that appears to be a prohibited output item is detected by the simple recognition program, when a structure is provided in which a warning message is outputted, a preventative result against improper use can be expected.

Moreover, when a structure is provided in which the image recognition process result carried out at the time image data is transferred from the image input device to the computer is used at the time image data is transferred from the computer to the previously described image formation device, a higher accuracy recognition process becomes possible.

What is claimed is:

1. An image recognition device provided in a computer for processing image data, comprising:

a storage portion for storing a recognition program for judging whether or not image data of a processing object is a prohibited output item; and an arithmetic processing portion for executing the recognition program stored in the storage portion in order to carry out a recognition process on the image data.

2. The image recognition device of claim 1, wherein the recognition program stored in the storage portion is transferred from a connected peripheral device for processing image data, and loaded.

3. The image recognition device of claim 2, further comprising a function for loading the recognition program at the time image data is transferred, and uninstalling the loaded recognition program after the imaging processing is completed.

4. The image recognition device of any of claims 1–3, further comprising a function for outputting and displaying a message on a monitor controlled by the computer in the case where the result of the execution of the recognition process by the arithmetic processing portion indicates that a prohibited output item has been detected.

5. A peripheral device for executing the transfer of image data, and which is connected to a computer, comprising:

a storage portion for storing a recognition program for judging whether or not image data of a transfer object is a prohibited output item; and a function for transferring the recognition program to the computer.

6. The peripheral device of claim 5, wherein the recognition program is stored in a state in which a security system is applied.

7. An image processing system equipped with an image forming device and a computer for outputting image data to the image forming device, wherein:

the image recognition device is provided in the computer and comprises a storage portion for storing a recognition program for judging whether or not image data of a processing object is a prohibited output item, and an arithmetic processing portion for executing the recognition program stored in the storage portion in order to carry out a recognition process on the image data; and the image forming device executes a process to prohibit normal output in accordance with a command outputted from the image recognition device provided in the computer.

8. An image processing system comprising:

a computer for processing image data, the computer being equipped with a storage portion for storing a recognition program for judging whether or not image data of a processing object is a prohibited output item, and an arithmetic processing portion for executing the recognition program stored in the storage portion in order to carry out a recognition process on the image data; and a peripheral device connected to the computer, the peripheral device being equipped with a storage portion for storing a recognition program for judging whether or not image data of a processing object is a prohibited output item, and a function for transferring the peripheral device recognition program to the computer;

wherein the recognition program stored in the storage portion of the computer is transferred from the connected peripheral device, and loaded;

wherein a dictionary portion is not provided in the recognition program stored in the peripheral device;

wherein a dictionary is provided in the computer; and wherein a recognition process is executed using the dictionary after the recognition program is transferred to the computer.

9. An image processing system comprising:

a computer for processing image data, the computer being equipped with a storage portion for storing a recognition program for judging whether or not image data of a processing object is a prohibited output item, and an arithmetic processing portion for executing the recognition program stored in the storage portion in order to carry out a recognition process on the image data; and a peripheral device connected to the computer, wherein the recognition program stored in the storage portion of the computer is transferred from the connected peripheral device, and loaded, and wherein:

a function for detecting whether or not a recognition program is stored in the peripheral device is provided in the computer.

10. The image processing system of claim 9, further comprising:

a simple recognition program provided in the computer;

wherein the simple recognition program is executed when the check function judges that a recognition program is not stored in the peripheral device.

11. The image processing system of claim 10, wherein a warning message is outputted to a display device connected to the computer in the case where the simple recognition program is executed, and it is judged that the image data of the processing object appears to be a prohibited output image.

12. An image processing system comprising:

a computer for processing image data, the computer being equipped with a storage portion for storing a recognition program for judging whether or not image data of a processing object is a prohibited output item, and an arithmetic processing portion for executing the recognition program stored in the storage portion in order to carry out a recognition process on the image data;

an image input device connected to the computer; and an image forming device connected to the computer, wherein image data acquired by the image input device is transferred to the computer, the transferred image data is transferred to the image forming device, and printing is carried out by the image forming device, and wherein:

the result of the image recognition process carried out at the time image data is transferred from the image input device to the computer is used at the time image data is transferred from the computer to the image forming device.

* * * * *